US012466416B2

(12) United States Patent
Mirkovic et al.

(10) Patent No.: US 12,466,416 B2
(45) Date of Patent: Nov. 11, 2025

(54) METHODS AND SYSTEMS FOR HANDLING OCCLUSIONS IN OPERATION OF AUTONOMOUS VEHICLE

(71) Applicant: FORD GLOBAL TECHNOLOGIES, LLC, Dearborn, MI (US)

(72) Inventors: Damir Mirkovic, Munich (DE); Daniel Althoff, Bavaria (DE); Christian Appelt, Gifhorn (DE); Georgios Fagogenis, Munich (DE); David Lenz, Munich (DE)

(73) Assignee: Ford Global Technologies, LLC, Dearborn, MI (US)

( * ) Notice: Subject to any disclaimer, the term of this patent is extended or adjusted under 35 U.S.C. 154(b) by 270 days.

(21) Appl. No.: 18/161,017

(22) Filed: Jan. 27, 2023

(65) Prior Publication Data

US 2024/0190452 A1     Jun. 13, 2024

(30) Foreign Application Priority Data

Dec. 12, 2022   (EP) .................................... 22386091

(51) Int. Cl.
*B60W 50/06*      (2006.01)
*B60W 50/00*      (2006.01)
*B60W 60/00*      (2020.01)

(52) U.S. Cl.
CPC ........ *B60W 50/06* (2013.01); *B60W 50/0097* (2013.01); *B60W 60/00276* (2020.02);
(Continued)

(58) Field of Classification Search
CPC .... G05D 2105/20; G05D 1/243; G05D 1/633; G05D 2107/13; G05D 2109/10;
(Continued)

(56) References Cited

U.S. PATENT DOCUMENTS 10,627,812 B2    4/2020   Eggert et al.
11,126,180 B1 *  9/2021   Kobilarov ....... B60W 30/18163
(Continued)

FOREIGN PATENT DOCUMENTS

EP           3757870 A1    12/2020

OTHER PUBLICATIONS

Extended European Search Report of European application No. 22386091.7 dated Apr. 18, 2023, 11 pages.
(Continued)

*Primary Examiner* — Navid Z. Mehdizadeh
*Assistant Examiner* — Caitlin R Mccleary
(74) *Attorney, Agent, or Firm* — Frank A. MacKenzie; Brooks Kushman, P.C.

(57) ABSTRACT

An autonomous vehicle navigates an environment in which occlusions block the vehicle's ability to detect moving objects. The vehicle handles this by receiving sensor data corresponding to the environment, identifying one or more particles of a plurality of initialized particles that have a non-zero probability of being associated with a potential occluded actor in the occluded region, and generating a trajectory of the autonomous vehicle for traversing the environment based on spatiotemporal reasoning about the occluded region and taking into account the one or more particles. Each particle may be associated with a potential actor.

14 Claims, 13 Drawing Sheets

(52) U.S. Cl.
CPC .............. *B60W 2554/4026* (2020.02); *B60W 2554/4029* (2020.02); *B60W 2554/4041* (2020.02)

(58) Field of Classification Search
CPC .............. G05D 2111/10; B60W 50/06; B60W 50/0097; B60W 60/00276; B60W 2554/4026; B60W 2554/4029; B60W 2554/4041; B60W 60/0016; B60W 30/0956; G08G 1/0145; G08G 1/0112; G08G 1/0133; G08G 1/09623; G08G 1/096725; G08G 1/096775; G08G 1/096791; G08G 1/096827; G08G 1/166; G08G 1/167; G06V 20/58; G01C 21/3461; G01C 21/3446; G01C 21/3476
See application file for complete search history.

(56) References Cited

U.S. PATENT DOCUMENTS

| | | | |
|---|---|---|---|
| 11,188,082 B2 | 11/2021 | Silva et al. | |
| 11,307,587 B2 | 4/2022 | Russell et al. | |
| 2020/0225669 A1* | 7/2020 | Silva | G01S 17/06 |
| 2020/0377092 A1 | 12/2020 | Torres et al. | |
| 2022/0185267 A1* | 6/2022 | Beller | B60W 30/0956 |
| 2022/0187090 A1 | 6/2022 | Yang et al. | |
| 2022/0315051 A1* | 10/2022 | Patel | B60W 60/0015 |
| 2023/0030815 A1* | 2/2023 | Happold | B60W 50/023 |
| 2023/0159026 A1* | 5/2023 | Pan | B60W 30/0953 701/301 |

OTHER PUBLICATIONS

Zhang et al., "Improved Occlusion Scenario Coverage With a POMDP-Based Behavior Planner for Autonomous Urban Driving", 2021 IEEE International Intelligent Transportation Systems Conference (ITSC), IEEE, Sep. 19, 2021 (Sep. 19, 2021), pp. 593-600, XP033993349, DOI:0.1109/ITSC48978.2021.9564424, [retrieved on Oct. 7, 2021].

Sanchez Jose et al., "Foresee the Unseen: Sequential Reasoning about Hidden Obstacles for Safe Driving", 2022 IEEE Intelligent Vehicles Symposium (IV), IEEE, Jun. 4, 2022 (Jun. 4, 2022), pp. 255-264, XP034152288, DOI: 10.1109/IV51971.2022.9827171, [retrieved on Jul. 19, 2022].

Zhang et al., "Safe Occlusion-aware Autonomous Driving via Game-Theoretic Active Perception", Princeton University, Princeton, NJ (2021), available at https://arxiv.org/pdf/2105.08169.pdf.

* cited by examiner

METHODS AND SYSTEMS FOR HANDLING OCCLUSIONS IN OPERATION OF AUTONOMOUS VEHICLE

CROSS-REFERENCE TO RELATED APPLICATIONS

The present application claims priority to European Patent Application No. 22386091.7, which was filed on Dec. 12, 2022, which is incorporated herein by reference in its entirety.

BACKGROUND

When an autonomous vehicle (AV) navigates through an environment, it must rely on various sensors to detect objects that are within its environment. An autonomous vehicle may use cameras, light detection and ranging (LiDAR) systems, radio detection and ranging (RADAR) systems, acoustic sensors and/or other sensors to gather this information. However, sensors typically cannot collect complete information about the environment. For example, AVs often encounter occlusions while navigating in the real world such as in dense urban areas, intersections, etc. Buildings, parked cars and other obstacles can occlude (i.e., block or shield) other objects, thus limiting the AV's ability to detect one or more objects in its environment.

As such, in addition to perceiving and tracking objects in the vehicle's surroundings, AVs need to reason about the parts of the world that are not seen by its sensor systems (e.g., due to occlusions). As such, navigating an environment may require the AV to, for example, pass around blind corners, move into spaces that are partially occluded by other objects, etc.

This document describes methods and systems that are designed to address at least some of the issues that AVs face when handling occlusions.

SUMMARY

This document describes methods, systems, and computer program products for handling occlusions during operations of an autonomous vehicle. For example, methods of navigating an autonomous vehicle through an environment including an occluded region can include receiving sensor data corresponding to the environment, identifying one or more particles of a plurality of initialized particles that have a non-zero probability of being associated with a potential occluded actor in the occluded region, and generating a trajectory of the autonomous vehicle for traversing the environment based on spatiotemporal reasoning about the occluded region and taking into account the one or more particles. Each particle may be associated with a potential actor.

Implementing systems of the above-described methods for handling occlusions can include, but are not limited to, a processor and a non-transitory computer-readable storage medium comprising programming instructions that are configured to cause the processor to implement a method for handling occlusions. Optionally, the programming instructions may be included in a computer program product.

BRIEF DESCRIPTION OF THE DRAWINGS

In the drawings, like reference numbers generally indicate identical or similar elements. Additionally, generally, the leftmost digit(s) of a reference number identifies the drawing in which the reference number first appears.

DETAILED DESCRIPTION

Figure 1:
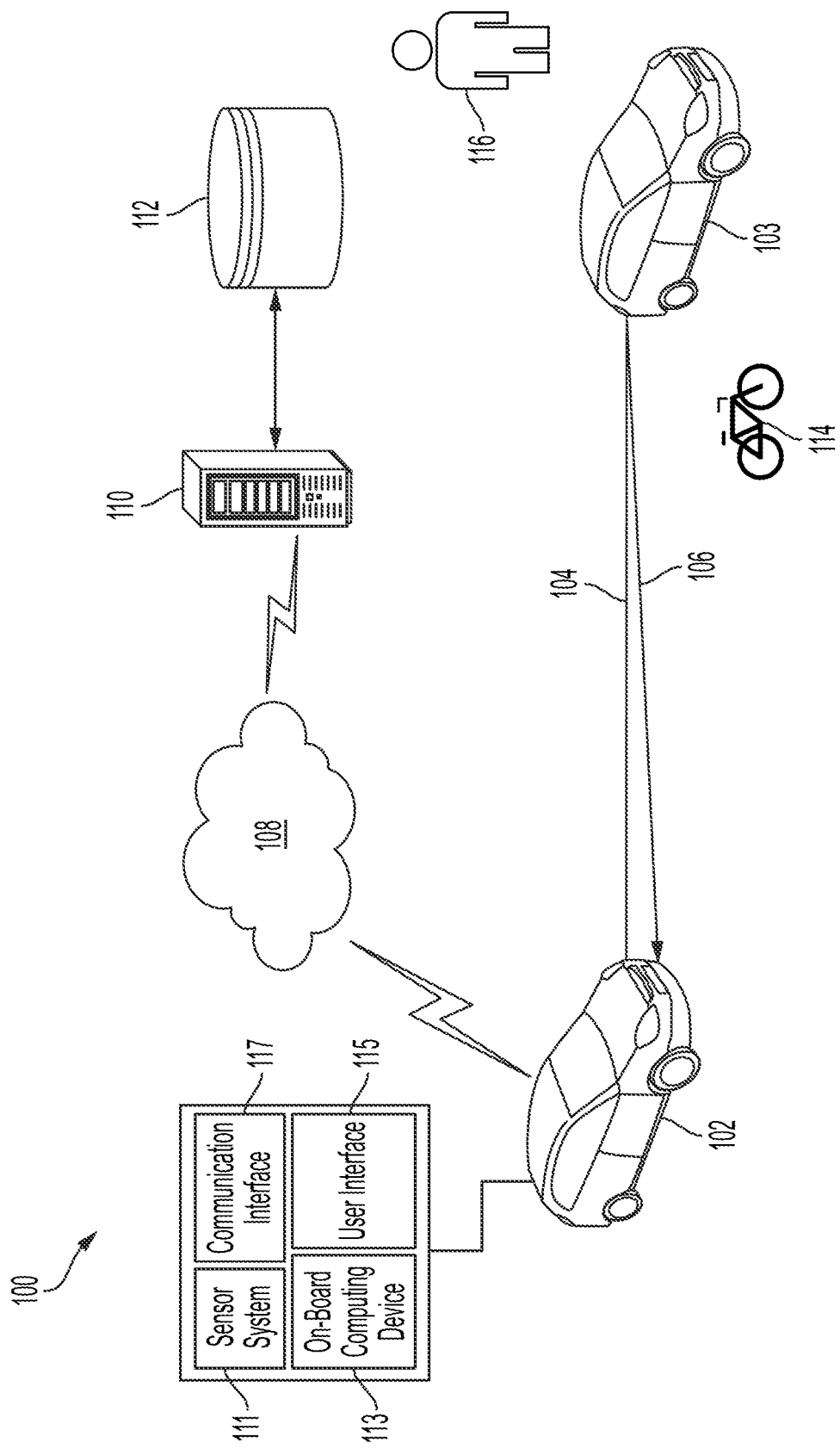
FIG. 1 illustrates an example system that includes a vehicle configured to model the unknown state of occluded regions in an environment.

Autonomous vehicles rely on sensor data collected by one or more sensors for navigation through dynamic and unstructured environments. However, sensor data corresponding to one or more regions of the environment may be unavailable and/or may not be reliable or accurate. This may occur, for example, due to the properties and/or state of the sensor systems (e.g., range of a sensor, field of view, resolution, fault states, etc.), state and/or properties of the environment (e.g., obstructions, noise, reflections, light conditions, etc.) such that the complete state of an environment (or at least certain regions in the environment) is temporarily or permanently unobservable or occluded for the autonomous vehicle. For instance, the range of a vehicle's sensors (camera, radar, sonar, LIDAR) may be limited to the order of 200 meters in a particular direction from the vehicle. Beyond this range, the vehicle is unable to detect objects. In other words, objects might be present beyond this range, but would not be detected or reported by the vehicle's sensors. In that regard, identifying objects which could be located beyond the range can be used to determine how to control the vehicle.

In everyday driving scenarios, occlusions are ubiquitous and may be encountered in various forms. Occlusions cannot be ignored because objects (moving or static) may be hidden in an occluded area behind an occlusion, and it is not practical to stop all forward progress when an AV encounters an occlusion. Because of these concerns, occlusions can trigger the AV's operating system to require human operator takeover and/or additional stops when the AV approaches an occlusion. As such, modeling the unknown state of the environment (i.e., inferring or reasoning about the occlusions) is required for operating an AV through the environment.

However, due to the combinatorial complexity of the feature space (e.g. occluded region shape, different road topology, actor and static obstacle shapes/positions, AV positions, etc.), prior art solutions rely on modeling the occluded regions by extracting a minimal set of abstract or complex features necessary to operate the autonomous vehicle (e.g., occluded region frontiers, time since last visible, etc.). Such solutions fail to take into account or model underlying processes such as occluded actors and their complex behaviors, dynamically changing occluded regions, tracked actors entering or leaving the occluded regions, or the like. Moreover, the extracted features of prior art solutions such as occluded region frontiers lack or include very limited temporal information (e.g., time since last occluded). As such, in order to reason about long-term temporal dependencies, such solutions need to maintain and reason over a long history of extracted features. Existing solutions also fail to take into account the correlation between the abstract features and the risk imposed by the features. For example, existing solutions fail to take into account the risk difference between two occluded vehicles where one is traveling faster than the other and model both occluded scenarios as the worst-case occluded vehicle approaching the occlusion frontier or boundary (this fails to consider a scenario that a fast potential occluded actor should be considered as the worst-case occluded actor when compared to a slower potential occluded actor at the same distance from the AV). The above limitations make the prior art solutions overly-conservative for urban autonomous driving scenarios because of their limited capability to model complex spatial and long-term temporal dependencies.

This document describes system, apparatus, device, method and/or computer program product embodiments, and/or combinations and sub-combinations of any of the above, for modeling the unknown states of the occluded regions of an AV's environment by taking into account the unobserved or unknown processes in the occluded regions of the environment (using a particle filter approach). The disclosure specifically teaches reducing modeling as well as computational complexity by representing the unknown state distribution over unobserved environment regions as a mixture of one or more generalized hypotheses, where each hypothesis represents an actor and has a related probability which is updated using a measurement model. Since every hypothesis represents an actor (and as such a potential state of the environment), hypotheses can be directly used for prediction, motion planning purposes, or otherwise maneuvering an AV through an environment. As used herein, a "hypothesis" represents an actor (e.g., a vehicle, cyclist, pedestrian, etc.) and its corresponding spatial position and orientation, speed, and acceleration.

The features described herein may enable an autonomous vehicle to respond to real objects in an environment, but which the AV's perception system is not able to perceive.

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" means "including, but not limited to."

The term "occlusion" or "occluded region" refers to a region of an environment that is unobserved due to lack of sensor data about the region. A region may be unobserved because of several reasons such as unavailability of sensors, sensors not providing any information, sensors providing insufficient information, or information provided by the sensors being of insufficient quality (e.g., outside of the field of view, range, or resolution of the sensor, obstruction of the sensor, sensor faults, noise, reflections, light conditions, etc.).

In this document, the term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

Definitions for additional terms that are relevant to this document are included at the end of this Detailed Description.

Notably, this document describes the present solution in the context of an AV. However, the present solution is not limited to vehicular applications. The present solution may be used in other applications such as other robotic applications, advanced driver assistance systems, virtual reality applications, image classification applications, and/or surveillance systems.

FIG. 1 illustrates an example system 100 in accordance with various aspects of the disclosure. System 100 includes a vehicle 102 that is traveling along a road in a semi-autonomous or autonomous manner. This document may sometimes refer to vehicle 102 as AV 102, although this disclosure is not necessarily limited to autonomous vehicles. AV 102 can include, but is not limited to, a land vehicle (as shown in FIG. 1), an aircraft, or a watercraft. As noted above, except where specifically noted this disclosure is not necessarily limited to AV embodiments, and it may include non-autonomous vehicles in some embodiments.

AV 102 includes one or more subsystems that are configured to collect data about the AV's environment and process that data to detect objects in its proximity. The objects can include, but are not limited to, a vehicle 103, cyclist 114 (such as a rider of a bicycle, electric scooter, motorcycle, or the like), and/or a pedestrian 116.

To collect this data, the AV 102 may include a sensor system 111, an on-board computing device 113, a communication interface 117, and a user interface 115. AV 102 may further include certain components (as illustrated, for example, in FIG. 11) included in vehicles, which may be controlled by the on-board computing device 113 using a variety of communication signals and/or commands, such as, for example, acceleration signals or commands, deceleration signals or commands, steering signals or commands, braking signals or commands, etc.

Figure 11:
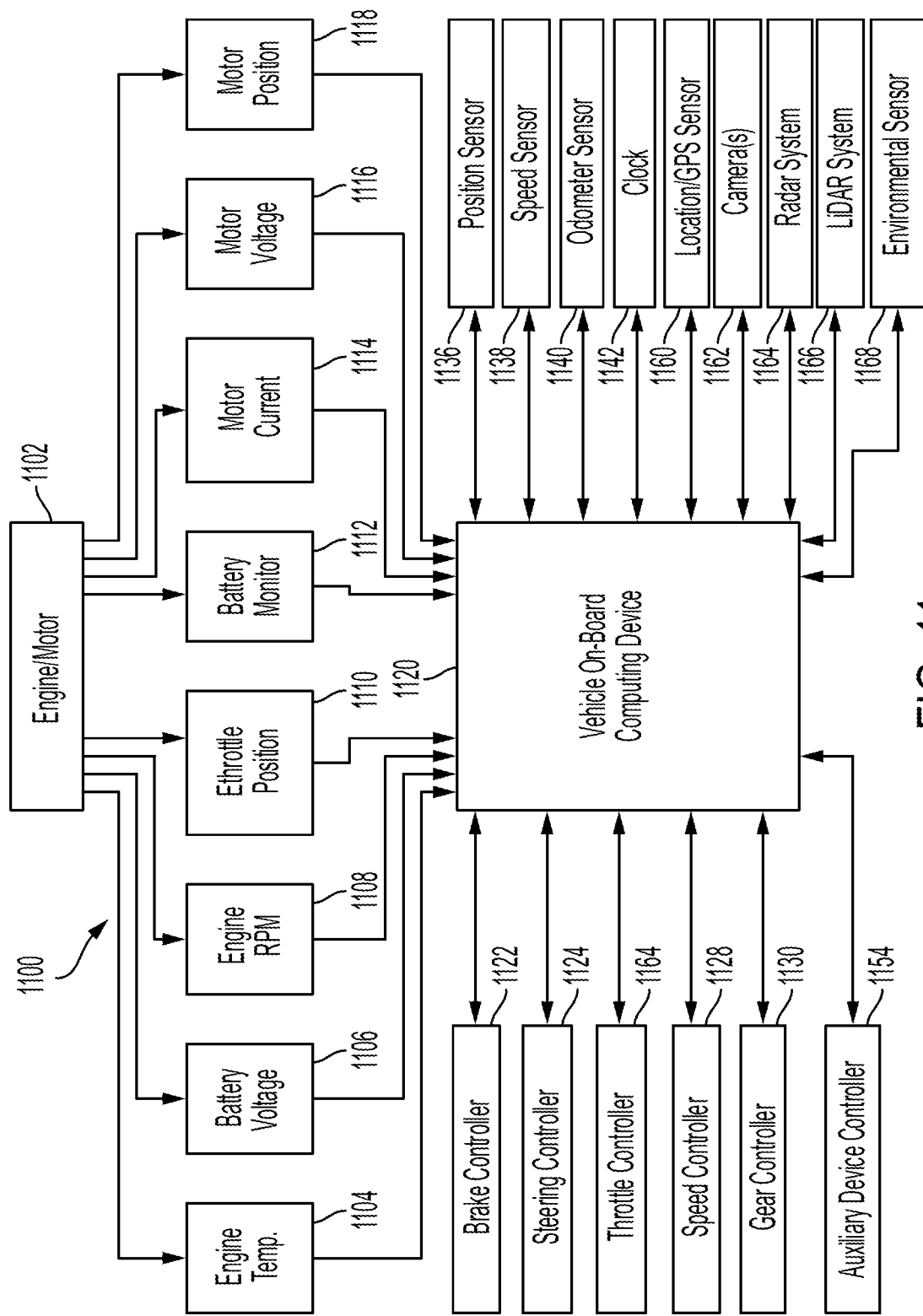
FIG. 11 illustrates an example architecture for a vehicle, in accordance with aspects of the disclosure.

The sensor system 111 may include one or more sensors that are coupled to and/or are included within the AV 102, as illustrated in FIG. 11. For example, such sensors may include, without limitation, a light detection and ranging (LiDAR) system, a radio detection and ranging (radar) system, a laser detection and ranging (LADAR) system, a sound navigation and ranging (sonar) system, one or more cameras (for example, visible spectrum cameras, infrared cameras, etc.), temperature sensors, position sensors (for example, a global positioning system (GPS), etc.), location sensors, fuel level sensors, motion sensors (for example, an inertial measurement unit (IMU), etc.), humidity sensors, occupancy sensors, or the like. The sensor data can include information that describes the location of objects within the surrounding environment of the AV 102, information about the environment itself, information about the motion of the AV 102, information about a route of the vehicle, or the like. As AV 102 travels over a surface, at least some of the sensors may collect data pertaining to the surface.

The AV 102 may also communicate sensor data collected by the sensor system to an offboard, remote computing device 110 (for example, a cloud processing system) over communications network 108. Remote computing device 110 may be configured with one or more servers to process data as described in this document. Remote computing device 110 may also be configured to communicate data/instructions to/from AV 102 over network 108, to/from server(s) and/or database(s) 112. The offboard computing device 110 may receive data that the vehicle collected during its run, such as perception data and operational data. The offboard computing device 110 also may transfer data or other information to the vehicle such as software updates, high definition (HD) map updates, machine learning model updates and other information.

Network 108 may include one or more wired or wireless networks. For example, the network 108 may include a cellular network (for example, a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (for example, the Public Switched Telephone Network (PSTN)), a private network, an ad hoc network, an intranet, the Internet, a fiber optic-based network, a cloud computing network, and/or the like, and/or a combination of these or other types of networks.

AV 102 may retrieve, receive, display, and edit information generated from a local application or delivered via network 108 from database 112. Database 112 may be configured to store and supply raw data, indexed data, structured data, map data, program instructions, or other configurations as is known.

The communication interface 117 may be configured to allow communication between AV 102 and external systems, such as, for example, external devices, sensors, other vehicles, servers, data stores, databases, etc. The communications interface 117 may utilize any now or hereafter known protocols, protection schemes, encodings, formats, packaging, etc. such as, without limitation, Wi-Fi, an infrared link, Bluetooth, etc. The user interface system 115 may be part of peripheral devices implemented within the AV 102 including, for example, a keyboard, a touch screen display device, a microphone, or a speaker. The vehicle also may receive state information, descriptive information or other information about devices or objects in its environment via the communication interface 117 over communication links such as those known as vehicle-to-vehicle, vehicle-to-object or other V2X communication links. The term "V2X" refers to a communication between a vehicle and any object that the vehicle may encounter or affect in its environment.

Figure 2:
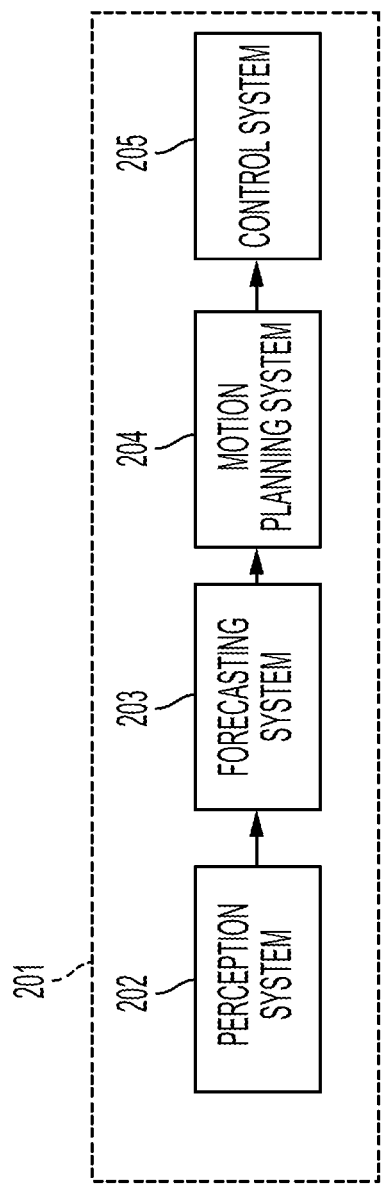
FIG. 2 is a block diagram that illustrates various subsystems of an autonomous vehicle.

Example systems onboard a vehicle are shown in the block diagram of FIG. 2. A vehicle's perception system 202 will capture information about objects in, and features of, the vehicle's environment. A vehicle's forecasting system 203 will generate predictions about the actions that other actors in the environment may take. The vehicle's motion planning system 204 and control system 205 will generate data and instructions that cause the vehicle to move in the environment. Various components of these systems will be described in the discussion of FIG. 12 below in this document. Certain components of these systems also may be embodied in processor hardware and computer-readable programming instructions that are part of the vehicle's onboard computing system 201.

The perception system 202 includes sensors that capture information about moving actors and other objects that exist in the vehicle's environment or surroundings. Example sensors include cameras, LiDAR systems, and radar systems. The data captured by such sensors (such as a digital image, lidar point cloud data, or radar data) is known as perception data. The perception system may include one or more processors, along with a computer-readable memory with programming instructions and/or trained artificial intelligence models that, during a run of the vehicle, will process the captured data to identify objects and assign categorical labels and unique identifiers to each object detected in a scene. Categorical labels may include categories such as vehicle, bicyclist, pedestrian, building, and the like. Methods of identifying objects and assigning categorical labels to objects are well known in the art, and any suitable classification process may be used, such as those that make bounding box classifications for detected objects in a scene and use convolutional neural networks or other computer vision models. Some such processes are described in "Yurtsever et al., A Survey of Autonomous Driving: Common Practices and Emerging Technologies" (arXiv Apr. 2, 2020).

If the vehicle is an AV, the vehicle's perception system 202 may deliver the perception data that it captures to the vehicle's forecasting system 203. The forecasting system 203 (which also may be referred to as a prediction system) will include processors and computer-readable programming instructions that are configured to process data received from the perception system and forecast actions of other actors that the perception system detects.

In an AV, the vehicle's perception system 202, as well as the vehicle's forecasting system 203, will deliver data and information to the vehicle's motion planning system 204 and motion control system 205 so that the receiving systems may assess such data and initiate any number of reactive motions to such data. The motion planning system 204 and control system 205 include and/or share one or more processors and computer-readable programming instructions that are configured to process data received from the other systems, determine a trajectory for the vehicle, and output commands to vehicle hardware to move the vehicle according to the determined trajectory. Example actions that such commands may cause the vehicle hardware to take include causing the vehicle's brake control system to actuate, causing the vehicle's acceleration control subsystem to increase speed of the vehicle, or causing the vehicle's steering control subsystem to turn the vehicle. Various motion planning techniques are well known, for example as described in Gonzalez et al., "A Review of Motion Planning Techniques for Automated Vehicles," published in IEEE Transactions on Intelligent Transportation Systems, vol. 17, no. 4 (April 2016).

In non-AV embodiments, such as with vehicles that are driven by human operators, the motion planning system 204 may be embodied in processor hardware and computer-readable hardware that are part of an electronic devices that is contained with the vehicle, such as a dashboard navigation system or a mobile electronic device of the operator. In such situations, the electronic device may output the trajectories planned by the motion planning system via a display, an audio speaker, or both. In addition, some parts of the perception system 202 may include a transceiver of an electronic device that receives certain perception data (such as weather data) from a remote server via wireless communication.

Figure 3:
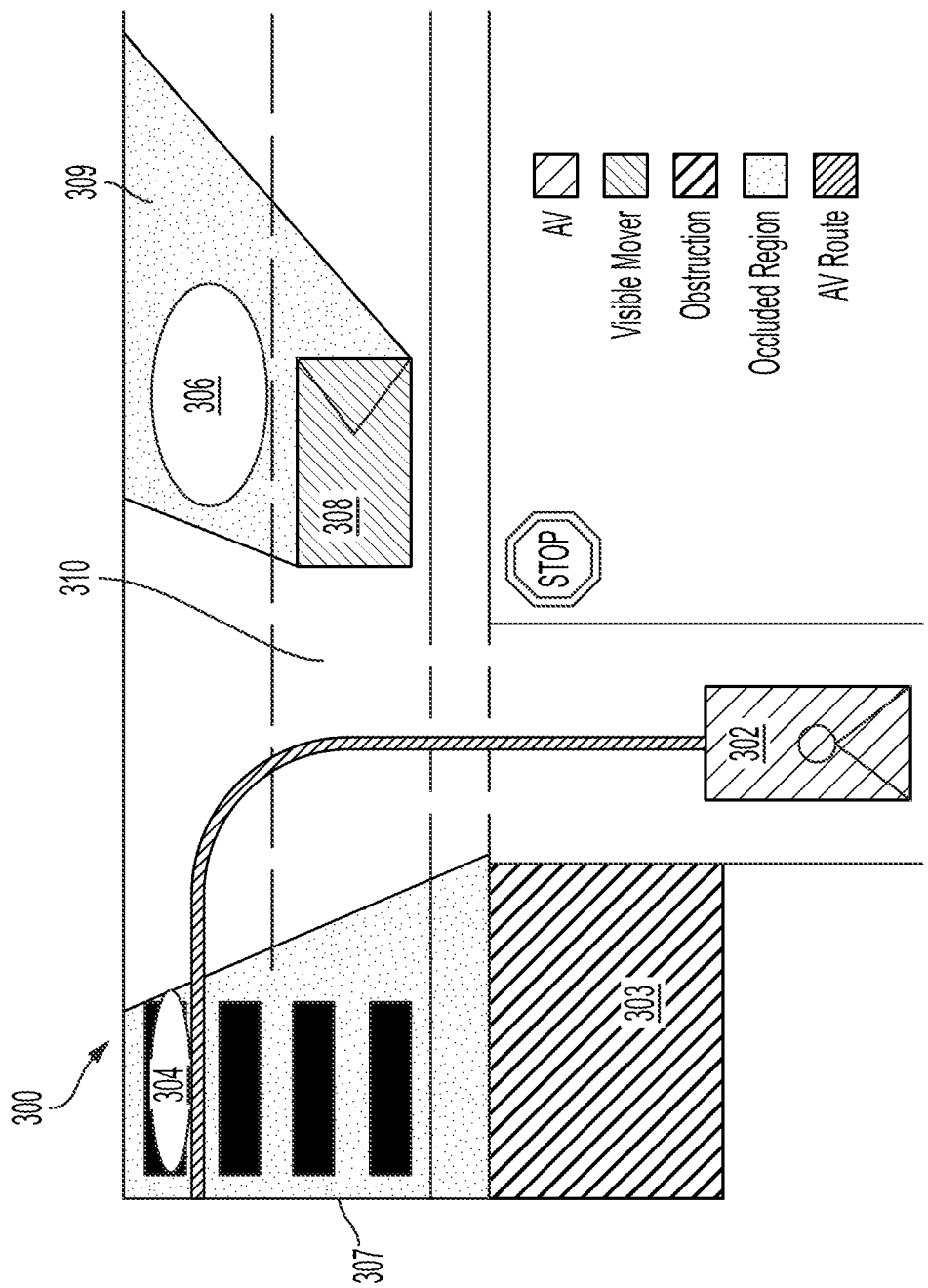
FIG. 3 illustrates an example autonomous vehicle (AV) moving through an environment and approaching an intersection.

FIG. 3 illustrates an example vehicle 302 (e.g., AV 102) moving through an environment 300 and approaching an intersection 310. Several objects are moving within or near the intersection 310 but are occluded from AV 302's view. For example, a pedestrian 304 is crossing one of the intersection's streets. However, a building 303 occludes the ability of the AV 302 sensors to see actors or obstacles in the occluded region 307 such that the AV 302 sensors fail to detect the pedestrian 304 (or another vehicle approaching the intersection). In addition, a vehicle 306 is approaching the intersection 310, but another vehicle 308 is positioned between AV 302 and the vehicle 306 and thus hinders the ability of the AV 302 sensors to detect the vehicle 306 located within occluded region 309. The other vehicle 308 and building 303 are thus obstructions in this example. The current disclosure describes systems and methods for handling such occluded regions for autonomous navigation of a vehicle through an environment. It should be noted that the example environment including an intersection of FIG. 3 is not limiting, and any other environment features are within the scope of this disclosure (e.g., bike lanes, lane segments, stop signs, crosswalks, etc.)

Figure 4:
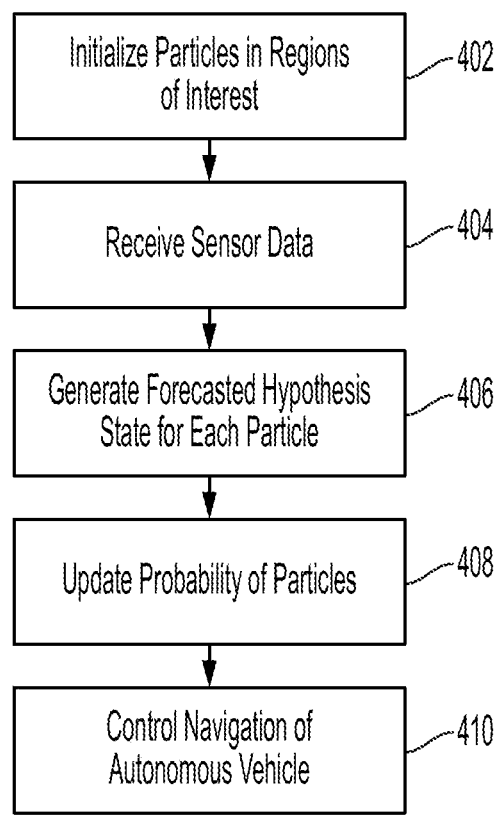
FIG. 4 illustrates a flowchart of an example process for modeling the unknown state of occluded regions in an environment.

A flowchart illustrating an example method for modeling the unknown state of occluded regions in an environment is shown in FIG. 4 (e.g., using a particle filter approach). The method starts at 402 when, for one or more regions of interest in the environment, the system may initialize (or spawn) an initial set of particles, where each particle is a potential actor (e.g., pedestrian, bicyclist, truck, car, etc.). Each initialized particle represents a hypothesis including, an initial hypothesis state (i.e., an initial position/orientation, speed, acceleration, and a type of the actor), and a corresponding initial probability. A region of interest may be any area that the AV needs to infer about for maneuvering through the environment such as, without limitation, a conflict region in the path of travel of an AV (i.e., a region where the AV's lane of travel while traveling on a route will overlap with another lane, lane segment, or region in the environment such as crosswalks, bicycle lanes, oncoming traffic lanes to which the AV needs to yield to, etc.), a crosswalk lane segment, a stop sign lane segment, a bicycle lane segment, conflicting lanes such as a lane segment with oncoming traffic, or the like. Examples of the initial hypothesis states may include, without limitation, a stationary bicycle, a bicycle moving with a constant velocity, a stationary pedestrian, a pedestrian moving with a constant velocity, a stationary vehicle of a certain type, a vehicle of a certain type moving with a constant velocity, an accelerating pedestrian, an accelerating bicycle, an accelerating vehicle, or the like.

An arbitrary number of particles may be spawned within each of the regions of interest based on, for example, available information (e.g., map data) about the region of interest. For example, particles corresponding to vehicles may be initialized on a road, particles corresponding to bicycles may be initialized on a bicycle lane, particles corresponding to pedestrians may be initialized on crosswalk, or the like. The initial set of particles can be sampled from a set of all possible states based on a prior distribution. For example, particles may be sampled (e.g., using uniform sampling or any other sampling techniques) along a lane centerline. Optionally, particles may be initialized within the regions of interest up to points of furthest interest, where a point of furthest interest is a point within the region of interest that is far enough from the AV such that a particle initialized at such a point cannot influence the AV's behavior and/or is outside the range of the AV's sensors.

Figure 5A:
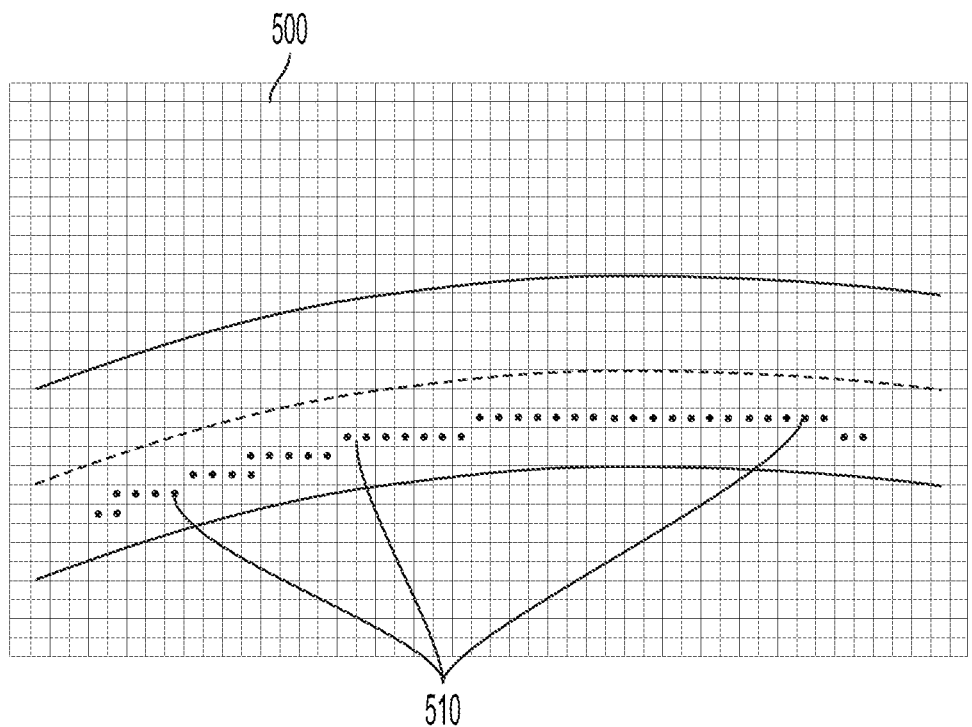
FIGS. 5A and 5B illustrate example particle initialization strategies.
Figure 5B:
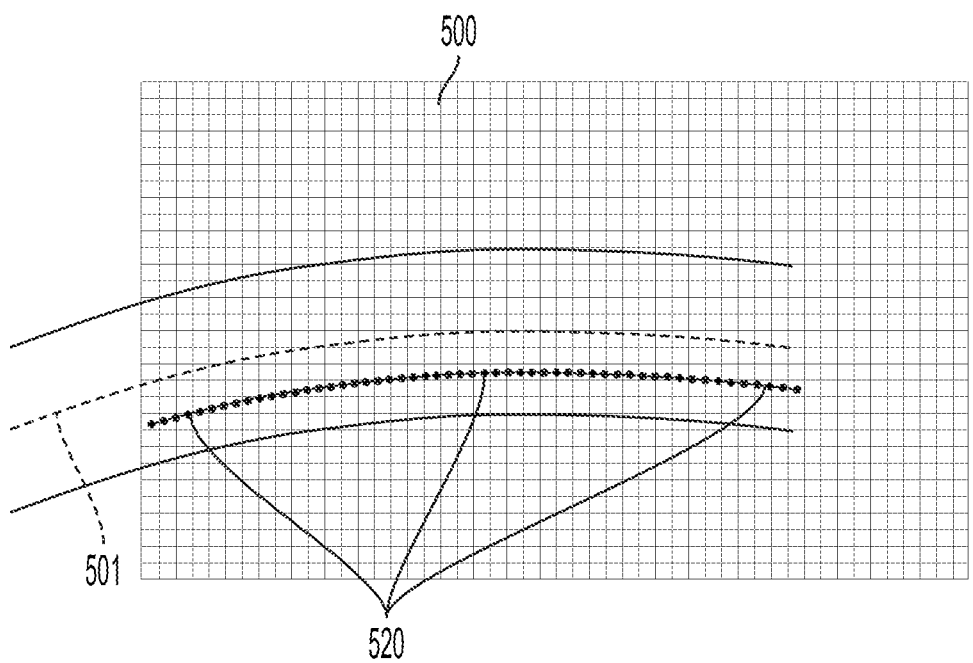

In various embodiments, the initial positions for the particles may be sampled based on a particle initialization policy such as, without limitation, a uniform distribution sampling over a continuous space, a uniform distribution sampling (or other sampling techniques) at the center of each of the cells of a grid 500 representing discretized region of interest (e.g., initial positions 510 in FIG. 5A), along the centerline of the lanes in the regions of interest (e.g., initial positions 520 in FIG. 5B), along a lateral direction with respect to the centerline in the regions of interest, or combinations thereof. For each sampled initial position, N particles may be sampled with constant velocities in the range $[v_{min}, v_{max}]$ where $v_{min}$ is the minimal particle velocity possible for that type of particle and $v_{max}$ is the speed limit in that region of interest or more than the speed limit or the maximal particle velocity possible for that type of particle. The initial pose of a vehicle particle may be determined based on the longitudinal and/or lateral position along the centerline of the lane segment in the region of interest and the corresponding heading information. The initial pose of a bicycle particle may be determined based on the longitudinal and/or lateral position along the centerline of the bicycle lane segment in the region of interest and the corresponding heading information. The initial pose of a pedestrian particle may be determined based on the longitudinal and/or lateral position of the pedestrian with respect to the geometry of the crosswalk. Each particle is, optionally, initialized with a fixed resolution over position, speed, and acceleration (e.g., the resolution of a grid representing the discretized region of interest and that is fixed with respect to a global reference frame where grid discretization is fine). Optionally, the particles may be initialized with a non-fixed resolution such as, without limitation, a non-linear resolution, situation aware dynamic particle (state) resolution, or the like. In various embodiments, the type of the particle may define the shape and/or pose of the corresponding actor. Optionally, a fixed shape (e.g., rectangle) and size of an actor may be assumed to be associated with each particle depending upon the type of actor the particle represents. The size and shape may vary for different actors (e.g., type of vehicle, bicycle, pedestrian, etc.).

Figure 6A:
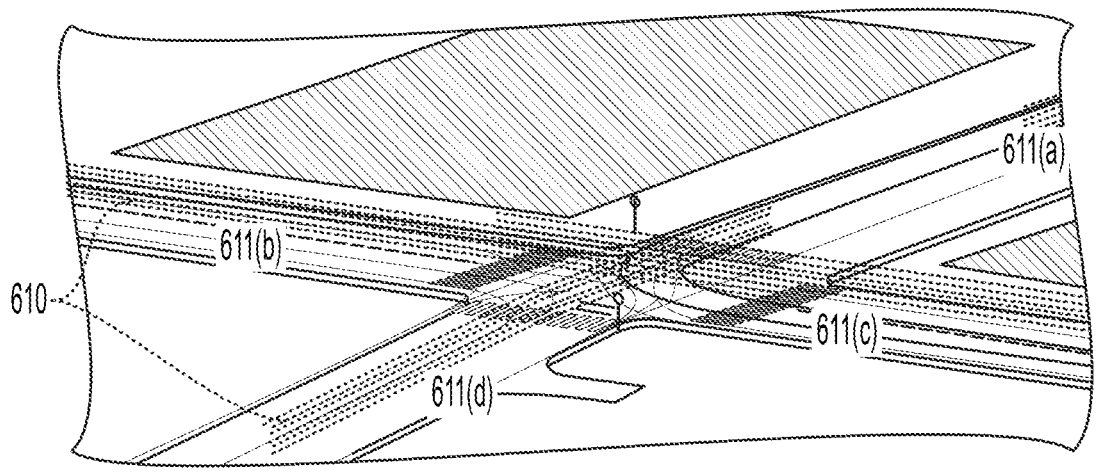
FIG. 6A illustrates example particle initialization for an environment including an intersection.

The initial set of particles are initialized and assigned a probability irrespective of occlusions or visibility (e.g., based on map data). Prior to receiving any data, all regions of interest could contain occluded objects with some prior probability. FIG. 6A illustrates the initialized set of particles 610 in one or more regions of interest (e.g., lane segments 611(*a*), 611(*b*), 611(*c*), and 611(*d*) in environment 600 when the AV is traveling in lane 611(*a*). The information illustrated in FIG. 6A is based on a particle motion model that assumes that the particles are moving with constant speed along the lane, and the only variable information is a 2D particle position and scalar speed. As such, FIG. 6A represents a 3D space where position in a 2D plane represents the particle position and Z-component represents the particle speed in the direction of the lane centerline.

An initial weight or probability [0,1] may be also assigned to each of the initialized particles to generate the initial hypotheses. The assigned initial probability for a particle is typically close to 1 upon particle initialization, but may take other values depending on availability of prior probability information based on the state of the environment (e.g., when there is available information that leads to assumption of a lower probability of an object being occluded at a particular position depending on various conditions such as, without limitation, time of day, type of the environment (e.g., intersection type, or the like).

In various embodiments, particles may also be initialized for every tracked actor in the region of interest. If the tracked actor is still visible in the subsequent planning cycle, it will get invalidated (as discussed below). However, the particle representing the occluded actor hypothesis is maintained if the tracked actor is not visible in the next planning cycle (as discussed below).

Next, at 404 the system may receive sensor data comprising information relating to the environment of the AV from one or more sensors (e.g., LiDAR, cameras, etc.).

The received information may be used to create a representation of the environment of the AV. The system may also use other available information about the environment (e.g., map data, road network data, lane topology, traffic data, etc.) for creating the environment representation. Optionally, the environment representation may include one or more occluded regions. An example of an environment representation may be a rasterized visibility map or grid that is a representation (e.g., planar, 2.5 dimensional, three-dimensional, etc.) of the environment that tells the AV where it can see and where it cannot see at any given time. The visibility map may be represented as a rectangular grid (or rasterized) including information relating to visibility and/or occlusion of each individual cell at a given time. In one or more embodiments, the visibility map is also representative of an ability of the AV to perceive or track one or more objects in the environment where the AV cannot perceive and/or track objects in the occluded regions or cells.

Next, for each of the initialized particles, forecasted states are generated (the initial hypothesis states are forecasted to generate updated hypothesis states) by propagating the particle according to a process model of the particle (406)—taking into account the initial hypothesis state that the particle represents. A forecasted hypothesis state corresponds to the time of measurement of sensor data.

In various embodiments, a subset of particles may be selected from the initial set of particles in step 402 based on the visibility map for further processing. Specifically, particles initialized within the visible regions of the environment (as determined based on the visibility map) may be discarded.

Figure 6B:
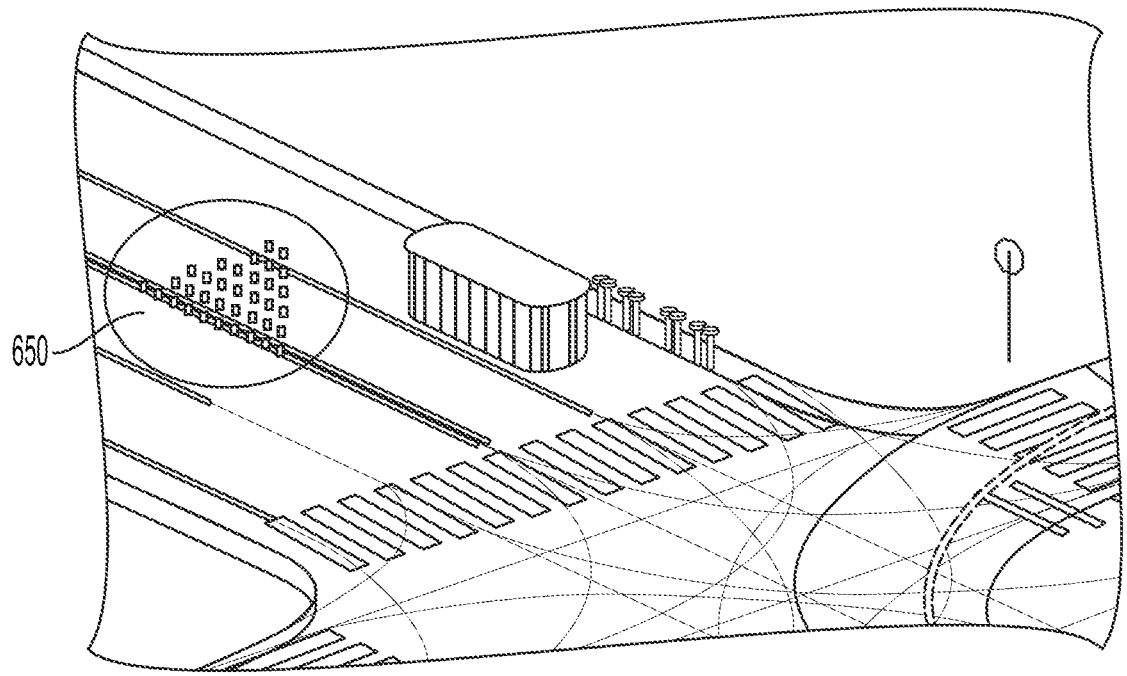
FIG. 6B illustrates generated forecasted hypothesis states for a selection of valid particles.
Figure 7:
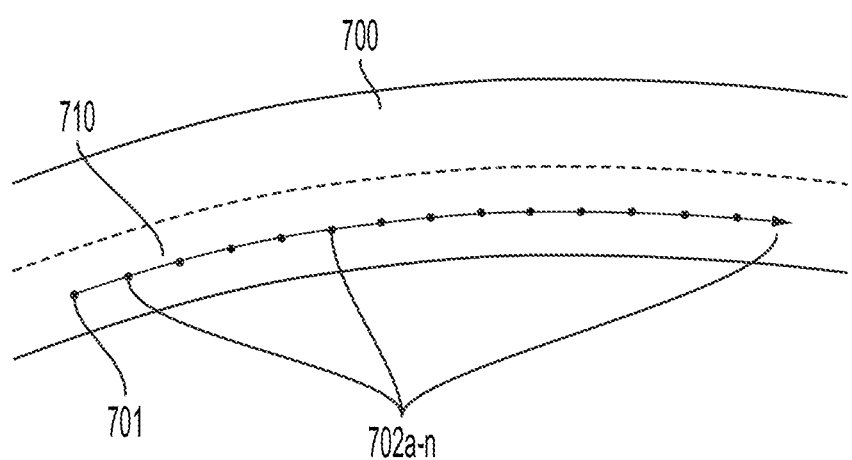
FIG. 7 illustrates example generation of forecasted particle hypotheses.

The process model may be a motion model (e.g., constant velocity motion model, constant acceleration motion model, etc.) depending upon the type of the actor the particle represents and the type of the hypothesis the particle represents. For example, a constant velocity model may be used to propagate particles (i.e., predict or forecast their future states) within the subset along a lane centerline, crosswalk, etc. In such scenarios, the particle position (since velocity is constant) is updated continuously and is not discretized. FIG. 7 illustrates the forecasted hypothesis states 702a-n of a particle along a lane centerline 710 (of a lane segment 700) from an initial position 701. FIG. 6B illustrates the forecasted hypothesis state of a subset of the particles 650.

Optionally, the motion model may be intelligent in the sense that it takes into account, for example, information about the environment (e.g., other actors, stop signs, lane demarcations, etc.) for generating the forecasted states.

State transition of a particle in an environment is influenced by the unobserved processes in the environment, and the probability can, therefore, be updated (validated or invalidated) through environmental observation. As such, at 408, initial probability corresponding to each particle may be updated based on, for example, the received sensor data and the corresponding forecasted hypothesis states, to generate an updated probability and an updated hypothesis. The updated probability is indicative of how likely it is for a particle to actually correspond to an actor given the sensor measurement data.

In one or more embodiments, the probability may be updated using a measurement model that takes into account the particle's state (initial and/or forecasted) and the most recent visibility map. In some example embodiments, the probability may be updated using a discrete (binary) measurement model such that if a threshold amount of the particle shape when the particle represents a forecasted hypothesis state lies inside the unoccluded part of the visibility map, the particle probability is set to zero (particle vanishes) because it is assumed that the area is visible and without objects and/or a potential actor is visible and being tracked. In various embodiments, the threshold may be specifically tuned for the visibility grid and/or a perception/tracking model such that, if an occluded particle is invalidated, the part of the environment is visible to perception/tracking with desired certainty.

Additionally and/or alternatively, in some example embodiments, the probability may be updated using a measurement model that is based on a ratio of the visible and invisible parts of the actor shape when the particle represents a forecasted hypothesis state as follows (optionally, saturated to a maximum value if $N_{visible\ actor\ cells}=0$):

$$P_{new}=P_{old}*(N_{invisible\ actor\ cells}/N_{visible\ actor\ cells})$$

Optionally, the discrete and the ratio-based measurement models above may be combined by requiring a minimum number of visible cells occupied by the actor necessary to lower the weight (e.g. only count the number of visible cells that exceeds the threshold of minimum visible cells). In certain other example embodiments, the measurement model may be learned from training data. For example, a data set of occluded/unoccluded/partially occluded regions with and without occluded actors in them may be used for training a deep learning model to classify various occluded region samples in order to learn various limitations of the object tracking model and generating the measurement model.

It should be noted that the above described measurement model may also be useful for invalidating particles that are associated with a certain type of actor that does not correspond to the state of the environment. For example, if a particle is initialized for a car actor in an occluded area that is visible enough such that a car cannot be occluded, but an occluded motorcycle could still exist there, the system may change the type of the actor represented by the particle to a motorcycle. (or vice versa).

Figure 6C:
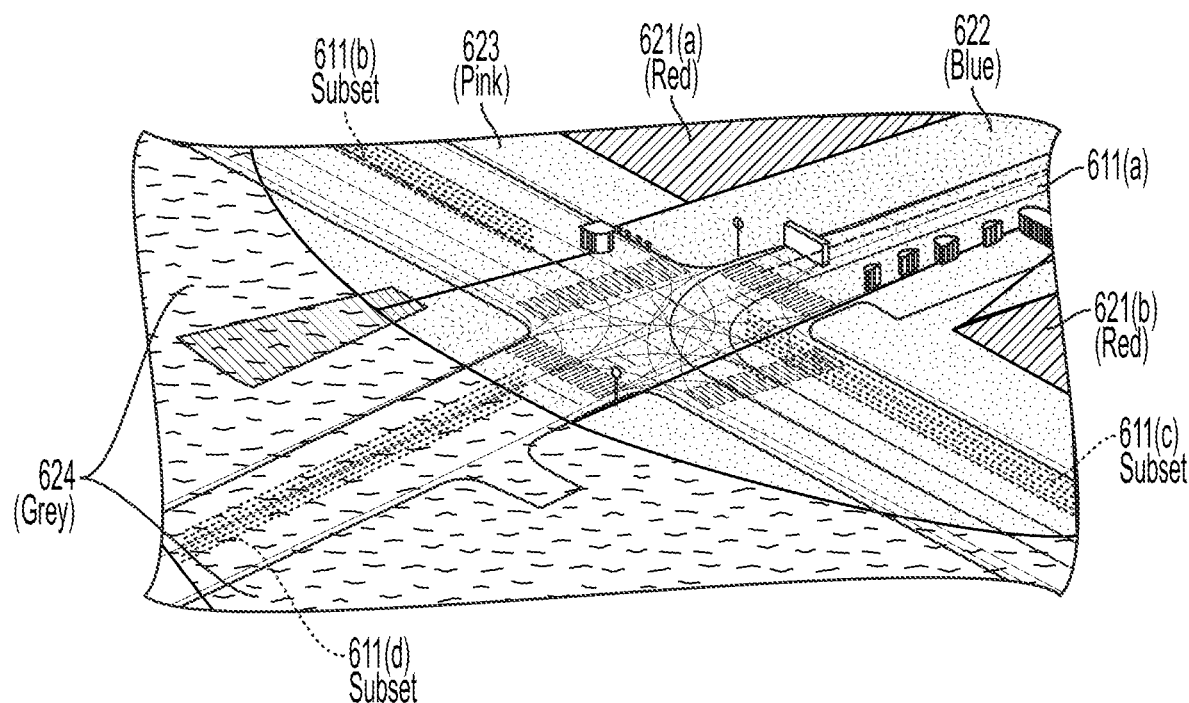
FIG. 6C illustrates an example update to the particle probability based on received sensor data.

Any particles representing hypotheses having a zero probability are discarded, while the particles representing hypotheses having a non-zero probability are considered valid hypotheses. For example, FIG. 6C illustrates only the valid particles representing hypotheses (having non-zero probability) corresponding to the regions of interest in the occluded regions (and unobserved regions) being retained from the initial set of particles shown in environment 600 of FIG. 6A. Specifically, a subset of particles 610 in occluded parts of lane segments 611(b), 611(c), and 611(d) are retained, while the others are discarded. As shown in FIG. 6C, when an AV is traveling in lane 611(a) of the environment, regions 621(a) and 621(b) may be occupied, region 622 may be visible, and region 623 may be occluded (by buildings, other vehicles, etc.). Additionally and/or alternatively, region 624 may be unobserved, and particles representing hypotheses included in such regions may also have non-zero probability.

Steps 402-408 allow the system to analyze or update the state of the particle population at any frequency, and may be repeated for every motion planning or data acquisition cycle.

Optionally, to reason about new potential occluded actors without having to sample an infinite number of initial particles (as discussed above with respect to step 402), new particles may be initialized only at the edge of the visibility map extent at every cycle (after an initialization step). Similarly, new particles may only be initialized at the edges of potential sources of occluded actors (e.g., driveways, parking spaces, etc.). Such particles may represent actors with different speeds and/or accelerations. Due to the movement of the AV, the extent of the visibility map is not constant and might change between cycles. To account for this, new particles may be spawned in the region between visibility maps for two consecutive cycles. Additionally and/or alternatively, new particles may also be initialized for every tracked actor (i.e., visible actor) that enters or may enter an occluded region in a region of interest of the environment. To account for potential velocity change while occluded or measurement uncertainty, multiple particles with different positions, velocities, and accelerations may be initialized.

Figure 8A:
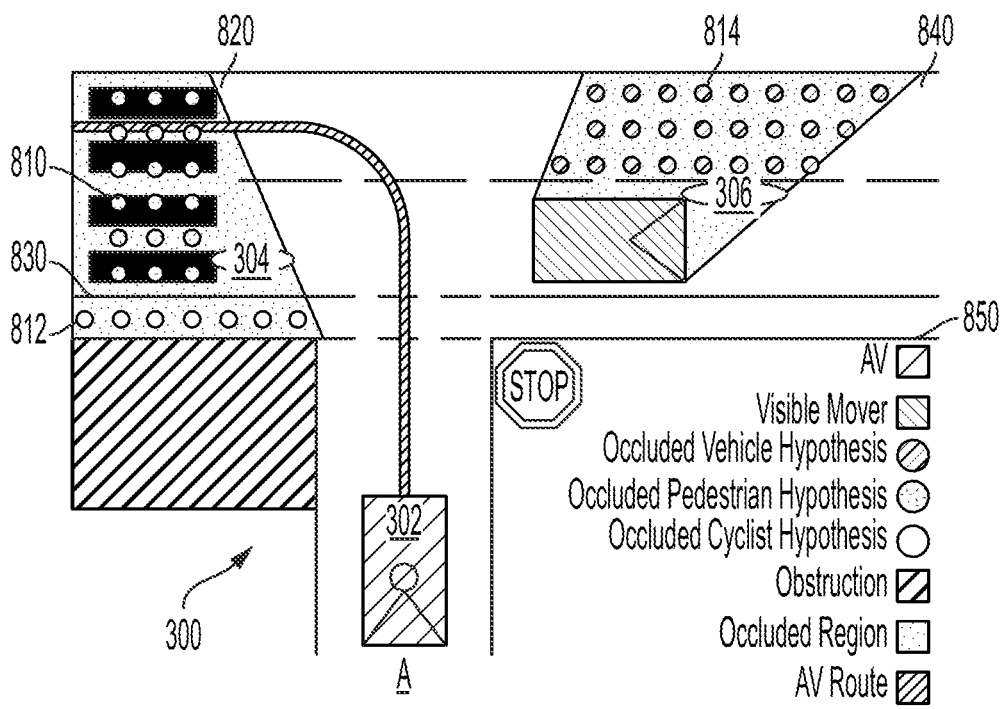
FIG. 8A illustrates a selection of valid particles in the environment of FIG. 3.
Figure 8B:
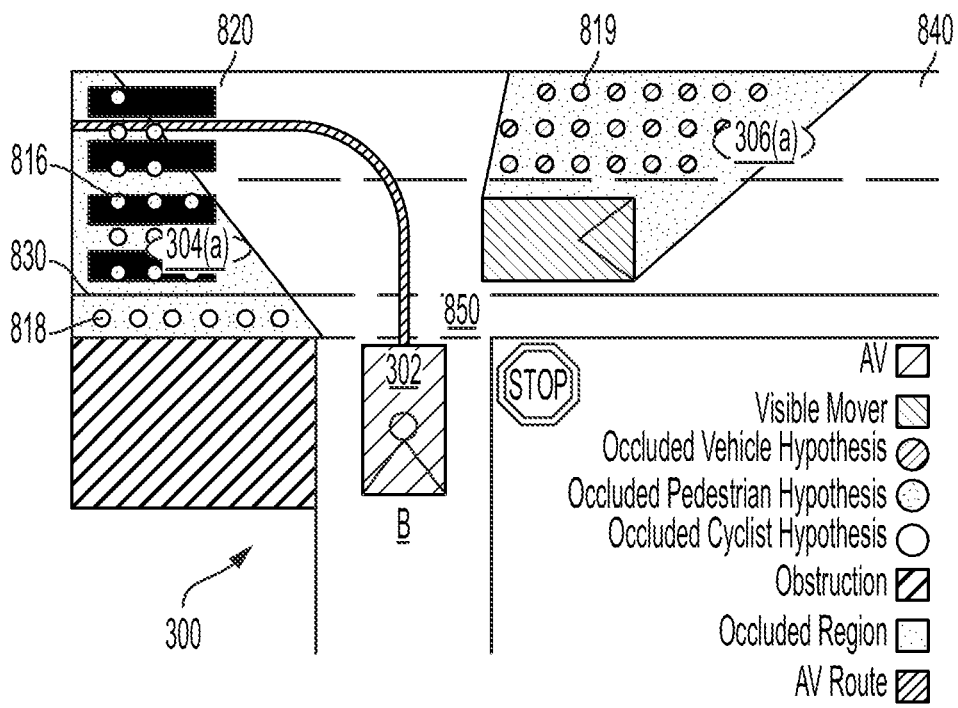
FIG. 8B illustrates updated valid particles in the environment of FIG. 3 during a subsequent planning cycle when the AV is at an updated position.

FIG. 8A illustrates the valid particle sets 810, 812, and 814 with non-zero hypothesis probability in each of the regions of interest (i.e., crosswalk 820, bike lane 830, and conflicting lane segment 840) in the environment shown in FIG. 3—i.e., the particle sets that lie within the two occluded regions of the environment shown in FIG. 3 (when the AV 302 is at position A). For example, each of the particles in particle set 810 may correspond to an occluded pedestrian representing corresponding hypotheses, each of the particles in particle set 812 may correspond to an occluded bicyclist representing corresponding hypotheses, and each of the particles in particle set 814 may correspond to an occluded vehicle representing corresponding hypotheses. FIG. 8B illustrates the valid particle sets 816, 818, and 819 with non-zero hypothesis probability in each of the regions of interest (i.e., crosswalk 820, bike lane 830, and conflicting lane segment 840) in the environment 300 when the AV 302 moves to a new position B during a subsequent motion planning cycle (as discussed above). FIG. 8B is also illustrative of what may happen if the AV creeps forward towards the stop line 850 to gain better visibility (i.e., more sensor data) about the occluded regions, and the number of valid particles in particle sets 816, 818, and 819 reduces from position A to position B. As shown the occluded regions shift, and may eventually achieve a configuration (not shown here) such that neither region of interest is sufficiently occluded to prevent further progress of the AV.

At 410, the valid particles (i.e., particles representing hypotheses with non-zero probability) may be used for reasoning about (i.e., inferring about and handling) occluded regions in the environment for controlling navigation of the AV through the environment. For example, the valid particles may be used for generating a trajectory of the AV through the environment (e.g., for prediction, motion planning, etc.). Specifically, since every valid particle represents a hypothesis corresponding to a potentially occluded actor, such hypotheses can be directly used or modeled for prediction or motion planning purposes to, for example, generate a set of constraints and/or cost function features for trajectory generation, as potential actor inputs for trajectory generation, for forecasting trajectories during prediction, or the like. Furthermore, every valid particle represents hypothesis corresponding to a feasible unroll of the state of the environment (i.e., history) from the initial state onward allowing for modeling of both high-resolution state and long-term temporal dependencies (i.e., spatiotemporal reasoning of the occluded regions of an environment). For example, as shown in FIGS. 8A and 8B, the valid sets of particles 810, 812, and 814 represent the state of the occluded regions of the environment 300 at a first time while valid sets of particles 816, 818, and 819 represent the state of the occluded regions of the environment 300 at a second time, and are indicative of both high-resolution state and long-term temporal dependencies. Similarly, FIG. 6B represents a state of the occluded regions of the environment 600 with longer temporal dependencies and finer state resolution than any prior art solutions.

Figure 9A:
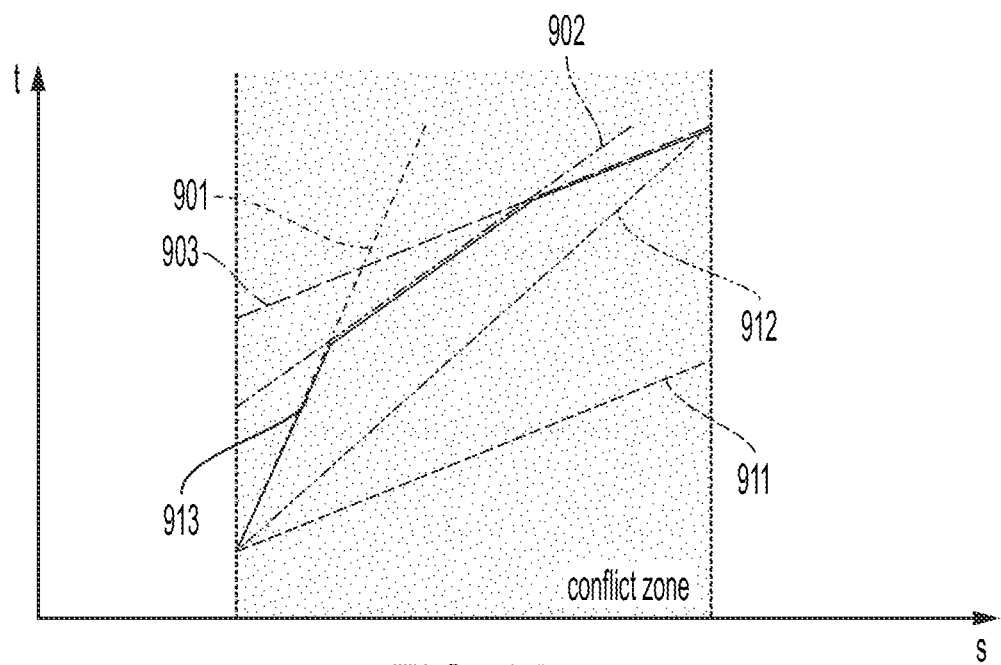
FIGS. 9A and 9B illustrate s-t graphs showing example worst-case occluded actor selection policies.

In one or more example embodiments, the valid particles may be used for reasoning about the occluded regions for controlling navigation of the AV by, for example and without limitation, inferring a worst-case potentially occluded actor for every region of interest (e.g., a crosswalk, conflicting lane, etc.) during a motion planning cycle. A worst-case potentially occluded actor may be an occluded actor that has a greater than threshold probability of intersecting with a trajectory of the AV within a certain time period (given its hypothesis state). For example, a worst-case potentially occluded actor may be a particle which arrives first to a conflict region based on its forecasted hypothesis state. Specifically, FIG. 9A illustrates an s-t graph showing potential worst-case potentially occluded actor scenarios. For example, depending on the time each of the three particles (901, 902, and 903) reaches a conflict region and their respective velocities, all three particles may contribute to the worst-case potentially occluded actor scenarios. The area of the conflict region under the graphs is appropriate for track-ahead trajectories. Therefore, every phantom actor that is more restrictive (i.e., is under 901, 902, and/or 903 lines) is more restrictive and appropriate.

Figure 9B:
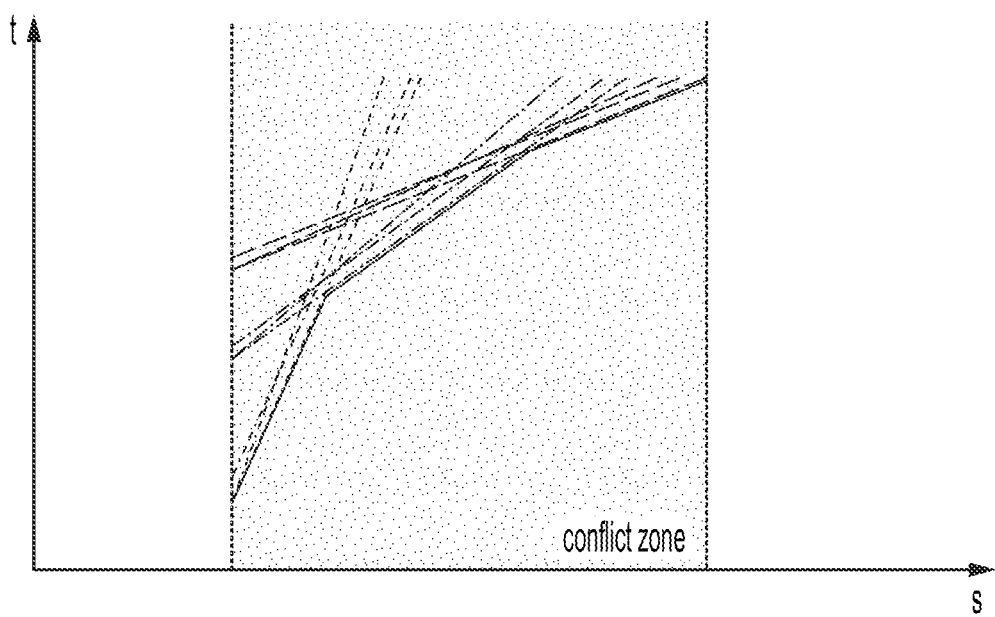

Additionally and/or alternatively, a phantom actor may be generated and/or the region of interest (e.g., conflict region) may be blocked off for a certain time period (e.g., until there are no valid particles corresponding to the region of interest, or a threshold time, upon receipt of a manual or other override command etc.) based on an analysis of the inferred worst-case potentially occluded actor. For example, for the scenario shown in FIG. 9A, the system may generate, without limitation: (i) a single phantom actor (911) which represents the most conservative worst-case scenario—an actor which reaches the conflict region with the time of the earliest particle with the velocity of the fastest one; (ii) a single phantom actor (912) entering the conflict region with the time of the earliest particle with velocity that would make it exit the conflict region at the time of the fastest particle; (iii) a single phantom actor (913) with complex velocity profile aggregating all relevant particles; (iv) multiple inferred actors representing multiple relevant particles (901, 902, and 903); (v) combine (i), (ii), and/or (iii) where a large number of similar particles are initially reduced to the conservative worst-case scenario particle and smaller number of resulting particles may be represented as shown in FIG. 9B; or combinations thereof.

Accordingly, the AV may generate a trajectory including, for example, stopping before an occluded region, creeping forward to get better visibility, and/or proceeding forward; taking into account the generated phantom object and/or the blocked conflict region. For example, if the worst-case potentially occluded actor corresponds to a pedestrian in an occluded crosswalk whose forecasted trajectory will intersect with that of the AV, the crosswalk may be blocked off until the worst-case scenario hypothesis is no longer valid. In this example, the generated trajectory of the AV may require the AV to stop before the occluded crosswalk while it is blocked off or veer around the occluded regions. On the other hand, if the worst-case potentially occluded actor corresponds to a pedestrian in an occluded crosswalk whose forecasted trajectory may not intersect with that of the AV (based on the current cycle prediction inputs), a phantom pedestrian actor corresponding to the worst-case potentially occluded actor may be generated and tracked over future planning cycles; and the generated trajectory of the AV may require the AV to slow down and attempt to creep to gain visibility before proceeding over the crosswalk. The worst-case potentially occluded actor hypothesis may be updated over subsequent planning cycles and the occluded region may be inferred about accordingly.

In another example, when a feasible occluded vehicle hypothesis is identified using the above methods, where the occluded vehicle has right-of-way in a conflicting lane of an intersection, the generated trajectory of the AV may require the AV to slow down and attempt to creep to gain visibility before committing to intersection. Similarly, when a feasible occluded bicyclist hypothesis is identified using the above methods, where the occluded bicyclist is in a bicycle lane, the generated trajectory of the AV may require the AV to slow down and attempt to creep to gain visibility before proceeding over the bicycle lane. In another example, when a feasible occluded oncoming vehicle hypothesis is identified using the above methods, where the occluded vehicle is in an oncoming lane, the generated trajectory of the AV may require the AV to avoid veering into an oncoming lane or prioritize return into the AV's lane if already veering. In yet another example, when a feasible occluded pedestrian hypothesis is identified using the above methods, where the occluded pedestrian is in an occluded crosswalk, the generated trajectory of the AV may require the AV to slow down and stop if necessary. In yet another example, when a feasible occluded actor hypothesis is identified ahead of the AV using the above methods, the generated trajectory of the AV may require the AV to slow down and stop if necessary. For example, in case of an environment including an intersection and oncoming vehicles and/or cyclists, the system may model phantom actor(s) and use them as an input to a prediction model pipeline and reason about them as a part of the standard motion planning workflow. In another example, for occluded crosswalks and/or actors ahead of the AV, the system may generate speed and stop constraints depending on a risk assessment.

The phantom actor is a virtual actor that is moving in a manner that will conflict with the AV's trajectory. For example, at every motion planning cycle, all valid particles may be assessed with respect to a potential conflict region (i.e., a region with which an AV's trajectory may intersect), and phantom actor(s) may be generated representing all valid relevant particles, (a subset of valid non-zero particles that may conflict with the AV's trajectory). In various embodiments, phantom actors may be generated for the particles that represent the worst-case potentially occluded actors by, for example, generating: a phantom actor that is forecasted to enter a conflict region first, a phantom actor which represents the most conservative worst-case scenario actor which reaches the conflict region with the time of the earliest particle with the velocity of the fastest one, a phantom actor entering the conflict region with the time of the earliest particle with velocity that would make it exit the conflict region at the time of the fastest particle, a single phantom actor with a complex velocity profile aggregating all valid particles, multiple phantom actors that each represent a valid particle, and/or combinations thereof.

Figure 6D:
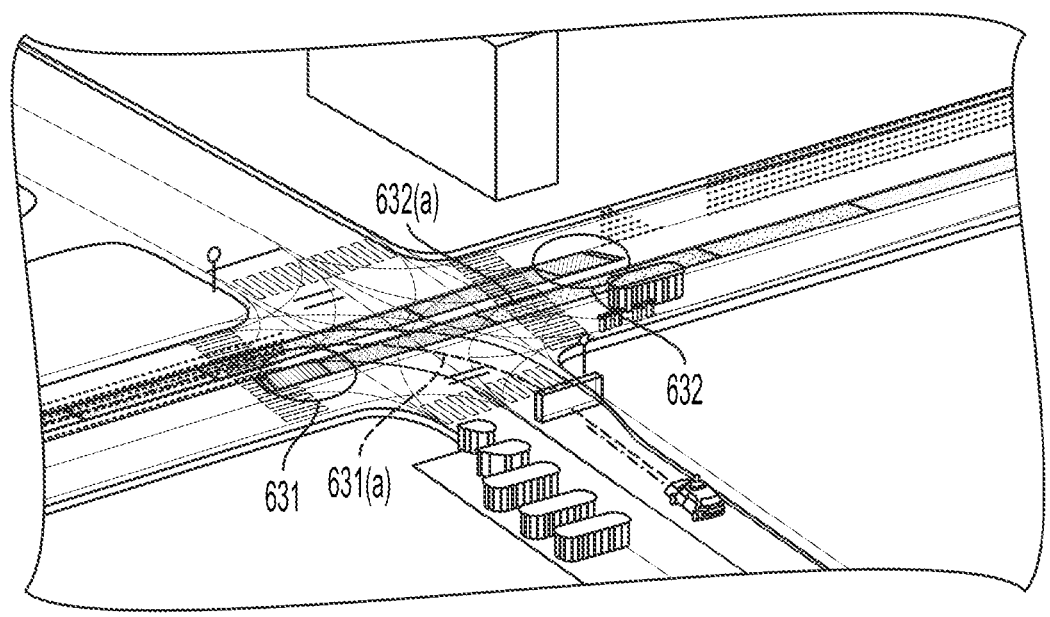
FIG. 6D illustrates generation of phantom actors in the environment of FIG. 6A.

For generating a phantom actor, the system will compute a footprint shape for an object shape centered at the corresponding valid point. The footprint may be a circular footprint, an oriented bounding box with an orientation aligned with the orientation of the lane, or any other type of footprint. The use of a footprint enables the system to choose a phantom actor that is of sufficient size and shape to represent the potentially occluded actor. To predict the trajectory of a phantom actor, the system may use an algorithm such as that described above, or it may use other motion prediction algorithms such as those that consider the location of the object within a lane (i.e., its location with respect to the lane's centerline), the pose of the object, and/or other information. Generation of a phantom actor and its trajectory is described in, for example, U.S. Pat. No. 11,332,132, the disclosure of which is incorporated herein by reference in its entirety. FIG. 6D illustrates worst-case phantom actor(s) 631 and 632 generated in occluded regions of the environment 600, where the generated trajectories 631(*a*) and 632(*a*) of the phantom actors 631 and 632 may intersect with a trajectory of the AV, and the AV may use the information about the phantom actors during trajectory generation (in addition to showing a state of the occluded region of the environment).

In various implementations, the system may use a predicted speed of the phantom actor to determine whether or not the phantom actor is expected to reach a conflict region before the AV will clear the conflict region at its current speed. The entry point may be a location at which the lane of travel of the phantom actor begins to intersect the AV's path of travel, a location set at a specified distance before that location, or another suitable location. The point of clearance may be the location at which intersection of the lane of travel and the conflicting lane end, or another suitable location. The system may use this by a straightforward function such as T=D/S, where T=time to intersection, S=speed of travel and D=distance to intersection along the centerline of the phantom actor's lane, and then comparing the T's for each of the AV and the phantom or real actor to determine whose time to conflict is lower (and thus will reach the intersection first). Other calculations also may be used, including trajectory prediction. If the system determines that the AV can clear the conflict region (e.g., with a threshold clearance) before the phantom actor enters it, then it may cause the AV to track ahead (i.e., to pass/clear the conflict region before the phantom actor) by continuing to move in the path of travel toward or past the conflict region while continuing to monitor for any occlusions and potential conflicting occluded actors that may be approaching in the conflicting lane as the AV moves forward. If the system determines that the AV will not likely clear the conflict region before the phantom actor reaches it, it may take a cautionary action such as decelerate (reduce the speed of travel) of the AV, thus continuing to move toward the conflict region with less aggressive speed while analyzing new data collected by the sensors. Optionally, the system may cause the AV to accelerate (increase the speed of travel) of the AV, such that the AV clears the conflict region before a potential impact. If the AV reaches the conflict region before confirming that it can clear the region before the phantom actor, it may cause the AV to stop. Otherwise, the system will continue to monitor the environment for occlusions and reason about them, as discussed above. If the AV stops at or before the intersection, the system may wait for a proceed override command before proceeding. A proceed override command may be a manual input by a human operator, a command that is automatically generated after a defined stop time, a command generated after verification of another phantom actor checking process, and/or a command received by other means.

As an optional feature, if the system determines that a phantom actor will reach the conflict region before the AV clears it, the system may permit the AV to pass beyond the conflict region if it can cautiously do so by accelerating (and/or by assuming the phantom actor is able to decelerate for the AV), while continuing to perform collision checking.

The examples below illustrate example scenarios where the methods described above may be used to handle different types of occlusions during autonomous driving:

Example 1: Occluded Crosswalks

The above discussed methods may be used for generating constraints during topological planning and/or in the prediction pipeline for navigating an AV through an environment that includes a conflict region (i.e., a crosswalk) which is at least partially occluded. When approaching a conflict region that includes a crosswalk, the AV typically needs to yield to a pedestrian in the crosswalk.

Figure 10:
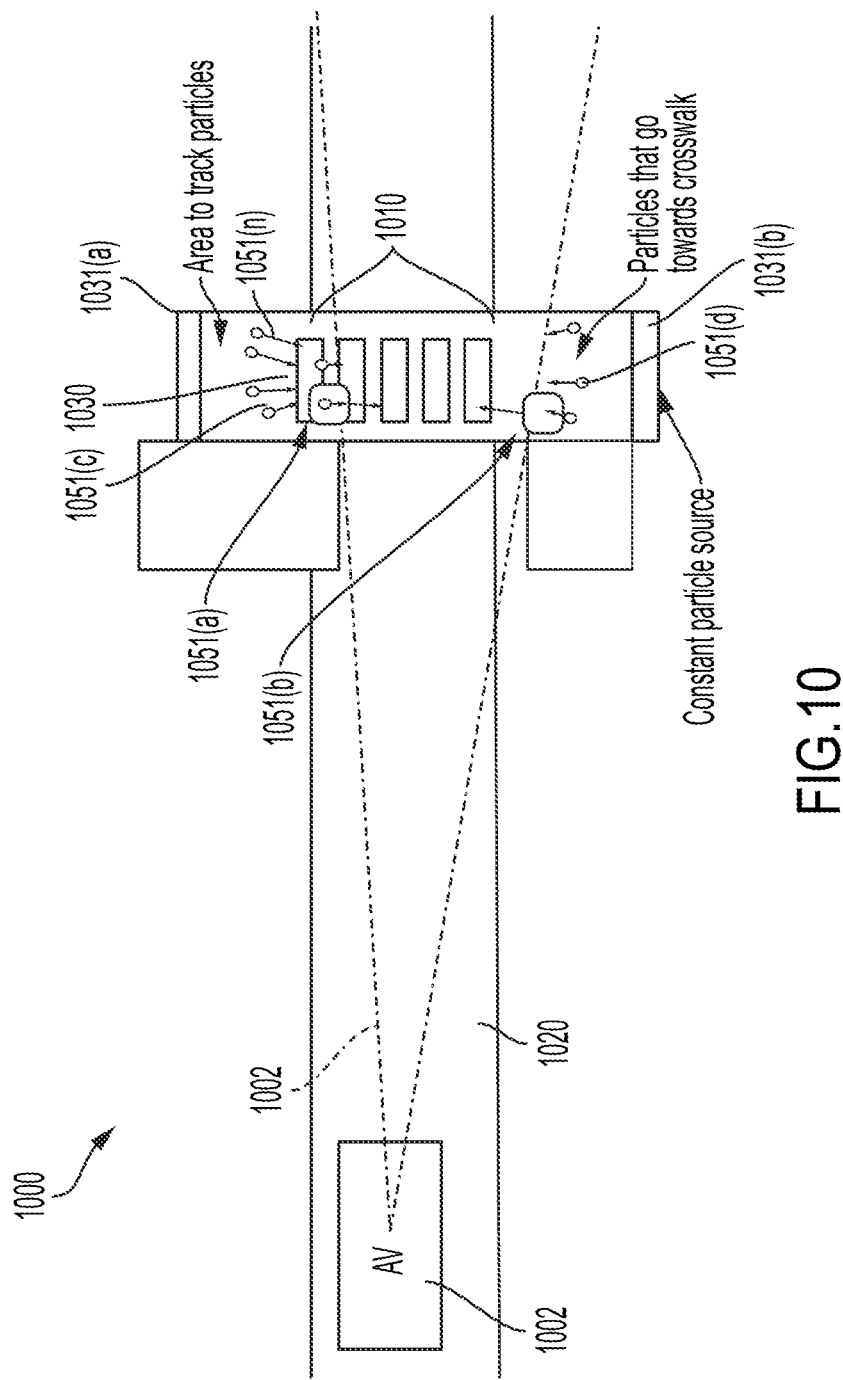
FIG. 10 illustrates how a system may reason about an occluded crosswalk in accordance with the process of FIG. 4.

FIG. 10 illustrates an example environment 1000 in which an AV 1002 is traveling in a lane 1020 that overlaps with a crosswalk 1030 to create a conflict region 1010. Certain parts of the crosswalk 1030 (and an extended region around the crosswalk) are occluded from the view of the sensors of the AV 1002. As such the methods discussed above (i.e., the particle filter approach) may be used by the AV to reason about the unknown state of the occluded regions. Specifically, as discussed above, system may collect sensor data and create a visibility map, and initialize particles in the conflict region (i.e., the entire crosswalk and/or surrounding areas irrespective of visibility or occlusion). Since conflict region corresponds to a crosswalk, the initialized particles may, optionally, correspond to pedestrians only (and the system may not consider other types of actors). After the first particle initialization, subsequent particles may be spawned or initialized only, for example, at the borders 1031(a) and 1031(b) of the crosswalk 1030 during subsequent motion planning cycles. Moreover, as discussed above, a particle may also be spawned for each pedestrian currently being tracked in the visible region of the crosswalk, and who may enter an occluded region of the crosswalk.

Each spawned particle is assigned an initial hypothesis state (i.e., position, velocity, and acceleration) and probability (~1). The forecasted hypothesis states for each particle may be generated using a constant velocity function towards and/or along the crosswalk with a fixed walking speed (e.g., about 1.5 m/s). Next, the initial probability of each initialized particle hypothesis is updated based on, for example, the received sensor data (i.e., the visibility map), as discussed above. Particles having a zero updated probability are discarded.

For reasoning about a crosswalk, the system may identify one or more valid particles that represent the worst-case scenario(s). For example, the output of the above methods may be the closest and/or fastest particle(s) on one or more sides of a crosswalk, and may represent the identified pedestrians that might enter the crosswalk. For example, FIG. 10 illustrates worst case particle scenarios 1051(a) and 1051(b) on either sides of the crosswalk 1030 from amongst the valid particles 1051(a)-(n).

The output of the particle filter may be used by the AV to, for example, create phantom pedestrian actors corresponding to the worst-case particles (i.e., worst-case potentially occluded actors) that have an intent to cross the crosswalk. The phantom actors may be considered by the AV during trajectory generation like any other actors in the AV's environment. In another example, the output of the particle filter may be used by the AV to generate constraints during trajectory generation, such as a speed constraint for the crosswalk (e.g., when a distance between the AV and the worst-case particle is less than a threshold). An example speed constraint may be a required deceleration rate. This allows the AV to approach the intersection based on the speed constraint and stop to yield to an occluded pedestrian, if needed.

Example 2: Limiting Speed while Approaching Unknown Areas in an Environment (i.e., Occluded Regions Ahead of the AV on AV's Route)

The methods discussed above may be used to reduce the speed of the AV such that the AV can come to a complete standstill before entering an unknown space. Such an unknown space may be created in front of an AV because of, for example, limitations associated with LiDAR sensors (e.g., due to blooming effect, sensor faults, weather conditions such as rain/snow, or the like), non-visible regions along the AV's route due to tight turns, non-visible regions along the AV's route due to high road slopes, or the like. Blooming occurs, for example, when a laser pulse emitted by a lidar sensor is reflected by a highly reflective target (e.g., a traffic sign or a headlight reflector). In this case, a large amount of emitted energy is sent back to the lidar compared to less reflective targets. The light beam sent back is usually not optimally focused. If blooming occurs, however, incorrect results can occur when measuring distances between the lidar and objects detected in its surroundings. In particular, due to blooming effects, false-positive lidar measurements can occur, so that the exact three-dimensional representation of the environment is made more difficult and unknown spaces are created.

The system may identify an occluded region frontier (i.e., an unknown or occluded region boundary), and use the frontier to generate a speed constraint that allows the AV to slow down before the frontier and potentially stop before it, using the methods discussed in this disclosure. While a frontier may be identified by simply querying a visibility map to identify an occluded frontier without temporal information, it is beneficial to not only reason about the start of the unknown space in the visibility map of the current planning cycle but also to use temporal reasoning. When the AV encounters an unknown region in front of the AV, the occluded space behind the false-positive detections caused by, for example, blooming might have been classified as free in previous cycles. Thus, temporal reasoning helps to push the frontier of the closest unknown space in front of the AV, making it more accurate and reliable for trajectory generation (without being overly conservative). Such spatiotemporal reasoning to identify a frontier may be performed using the methods of the disclosure discussed above.

Specifically, the system may add lane segments ahead of the AV to create conflict regions. The system may then initialize or spawn particles in the conflict region ahead of the AV (with initial hypotheses and probability); generate forecasted hypotheses; update the probability; and invalidate visible particles ahead of the AV as discussed above. The blooming frontier may then be defined by the valid particle that is closest to the AV.

Optionally, the system may then check if the identified occluded frontier lies between the AV and the closest tracked actor ahead of the AV (in case the AV is tracking behind). In such examples, if the frontier of the unknown space is closer to the AV than any other tracked actor, the system may reason about the unknown space in front of the AV and set up a spatial speed constraint in front of the unknown space to ensure that the AV is able to come to a complete stop before entering the unknown space. The system may do so by identifying from amongst the valid particles a leading actor for tracking behind such leading actor. Specifically, since the particles are initialized for tracked actors, the system may check if the worst-case occluded particle is closer to the AV than the tracked actor particle for a planning cycle. Next, for trajectory generation, when the frontier is between the AV and the identified leading actor, the system may generate a soft velocity constraint for tracking behind the leading actor.

However, if the tracked leading actor is between the AV and the occluded region frontier, the system may not generate any additional constraint and may generate a trajectory for the vehicle to track behind the leading actor. When the AV is tracking behind an actor (e.g. a big truck), the space ahead of such an actor might be unknown since the actor occludes this entire space. However, the system may not generate speed constraints regarding the unknown space if the AV is tracking behind a visible tracked actor and the unknown space starts behind this actor because such speed constraints will dominate the track behind constraint and thus result in too conservative behavior. Instead, the system assumes that the actor in front of the AV drives at a reasonable speed and will not collide with any obstacles in front of it.

Unknown or occluded regions created in an environment because of, for example, roads with extreme grades, curved roads with occluding structures, or the like, may be similarly reasoned about.

Example 3: Occlusion Reasoning for Lane Departure

Often a vehicle may need to drive into opposing traffic lanes (e.g., for taking over an object tracking ahead of the vehicle, for making unprotected left turns, etc.), and such opposing traffic lanes may be occluded by other actors in the environment. Prior art solutions perform lane-level-based reasoning of the pure existence of oncoming actors without considering spatiotemporal analysis such that the derate feature might get triggered more often than needed slowing down the AV unnecessarily. Moreover, very distant occluded areas that cause phantom objects might trigger an overcautious behavior making the AV creep into the oncoming lane unnaturally slowly. The methods of this disclosure allow the vehicle to reason about such situations spatially as well as temporally. Specifically, the system may add adjacent oncoming lane segments to the conflict regions, spawn particles within such lane segments, identify valid particles in the oncoming lane based on forecasted particle hypothesis and sensor data, and generate a derate speed constraint based on the worst-case valid particle by, for example, generating a phantom actor for a valid occluded actor hypothesis with minimal time to conflict (e.g., particle closest to the AV, particle that will collide with the AV the earliest during a lane departure maneuver, etc.).

Compared to prior art solutions which attempt to extract a small number of more abstract features, the methods and systems of the current disclosure explicitly model the occluded state of the environment. This allows for modeling of more complex hypotheses (e.g. high number of potentially occluded movers with different speeds and positions compared to existence or absence of the occluded region frontier) and long-term spatiotemporal dependencies (e.g. long-term history of continuously changing occluded regions and environment states compared to the short-term history of the occluded region frontier). As such, the system can make stronger assumptions on the state of the environment (e.g. object permanence) and generate an AV trajectory accordingly allowing the AV to be much less conservative in the presence of occlusions.

FIG. 11 illustrates an example system architecture 1100 for a vehicle, in accordance with aspects of the disclosure. Vehicles 102 and/or 103 of FIG. 1 can have the same or similar system architecture as that shown in FIG. 11. Thus, the following discussion of system architecture 1100 is sufficient for understanding vehicle(s) 102, 103 of FIG. 1. However, other types of vehicles are considered within the scope of the technology described in this document and may contain more or less elements as described in association with FIG. 11. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 11, system architecture 1100 for a vehicle includes an engine or motor 1102 and various sensors 1104-1118 for measuring various parameters of the vehicle. In gas-powered or hybrid vehicles having a fuel-powered engine, the sensors may include, for example, an engine temperature sensor 1104, a battery voltage sensor 1106, an engine revolutions per minute ("RPM") sensor 1108, and a throttle position sensor 1110. If the vehicle is an electric or hybrid vehicle, then the vehicle may have an electric motor, and accordingly includes sensors such as a battery monitoring system 1112 (to measure current, voltage and/or temperature of the battery), motor current 1114 and voltage 1116 sensors, and motor position sensors 1118 such as resolvers and encoders.

Operational parameter sensors that are common to both types of vehicles include, for example: a position sensor 1136 such as an accelerometer, gyroscope and/or inertial measurement unit; a speed sensor 1138; and an odometer sensor 1140. The vehicle also may have a clock 1142 that the system uses to determine vehicle time during operation. The clock 1142 may be encoded into the vehicle on-board computing device, it may be a separate device, or multiple clocks may be available.

The vehicle also may include various sensors that operate to gather information about the environment in which the vehicle is traveling. These sensors may include, for example: a location sensor 1160 (such as a Global Positioning System ("GPS") device); object detection sensors such as one or more cameras 1162; a lidar system 1164; and/or a radar and/or a sonar system 1166. The sensors also may include environmental sensors 1168 such as a precipitation sensor and/or ambient temperature sensor. The object detection sensors may enable the vehicle to detect objects that are within a given distance range of the vehicle in any direction, while the environmental sensors collect data about environmental conditions within the vehicle's area of travel.

During operations, information is communicated from the sensors to a vehicle on-board computing device 1120. The on-board computing device 1120 may be implemented using the computer system of FIG. 12. The vehicle on-board computing device 1120 analyzes the data captured by the sensors and optionally controls operations of the vehicle based on results of the analysis. For example, the vehicle on-board computing device 1120 may control: braking via a brake controller 1122; direction via a steering controller 1124; speed and acceleration via a throttle controller 1126 (in a gas-powered vehicle) or a motor speed controller 1128 (such as a current level controller in an electric vehicle); a differential gear controller 1130 (in vehicles with transmissions); and/or other controllers. Auxiliary device controller 1154 may be configured to control one or more auxiliary devices, such as testing systems, auxiliary sensors, mobile devices transported by the vehicle, etc.

Geographic location information may be communicated from the location sensor 1160 to the on-board computing device 1120, which may then access a map of the environment that corresponds to the location information to determine known fixed features of the environment such as streets, buildings, stop signs and/or stop/go signals. Captured images from the cameras 1162 and/or object detection information captured from sensors such as lidar system 1164 is communicated from those sensors to the on-board computing device 1120. The object detection information and/or captured images are processed by the on-board computing device 1120 to detect objects in proximity to the vehicle. Any known or to be known technique for making an object detection based on sensor data and/or captured images can be used in the embodiments disclosed in this document.

Lidar information is communicated from lidar system 1164 to the on-board computing device 1120. Additionally, captured images are communicated from the camera(s) 1162 to the vehicle on-board computing device 1120. The lidar information and/or captured images are processed by the vehicle on-board computing device 1120 to detect objects in proximity to the vehicle. The manner in which the object detections are made by the vehicle on-board computing device 1120 includes such capabilities detailed in this disclosure.

In addition, the system architecture 1100 may include an onboard display device that may generate and output an interface on which sensor data, vehicle status information, or outputs generated by the processes described in this document are displayed to an occupant of the vehicle. The display device may include, or a separate device may be, an audio speaker that presents such information in audio format.

The on-board computing device 1120 may include and/or may be in communication with a routing controller that generates a navigation route from a start position to a destination position for an autonomous vehicle. The routing controller may access a map data store to identify possible routes and road segments that a vehicle can travel on to get from the start position to the destination position. The routing controller may score the possible routes and identify a preferred route to reach the destination. For example, the routing controller may generate a navigation route that minimizes Euclidean distance traveled or other cost function during the route, and may further access the traffic information and/or estimates that can affect an amount of time it will take to travel on a particular route. Depending on implementation, the routing controller may generate one or more routes using various routing methods, such as Dijkstra's algorithm, Bellman-Ford algorithm, or other algorithms. The routing controller may also use the traffic information to generate a navigation route that reflects expected conditions of the route (e.g., current day of the week or current time of day, etc.), such that a route generated for travel during rush-hour may differ from a route generated for travel late at night. The routing controller may also generate more than one navigation route to a destination and send more than one of these navigation routes to a user for selection by the user from among various possible routes.

In various embodiments, the on-board computing device 1120 may determine perception information of the surrounding environment of the vehicle. Based on the sensor data provided by one or more sensors and location information that is obtained, the on-board computing device 1120 may determine perception information of the surrounding environment of the vehicle. The perception information may represent what an ordinary driver would perceive in the surrounding environment of a vehicle. The perception data may include information relating to one or more objects in the environment of the vehicle. For example, the on-board computing device 1120 may process sensor data (e.g., lidar or radar data, camera images, etc.) in order to identify objects and/or features in the environment of vehicle. The objects may include traffic signals, roadway boundaries, other vehicles, pedestrians, and/or obstacles, etc. The on-board computing device 1120 may use any now or hereafter known object recognition algorithms, video tracking algorithms, and computer vision algorithms (e.g., track objects frame-to-frame iteratively over a number of time periods) to determine the perception.

In some embodiments, the on-board computing device 1120 may also determine, for one or more identified objects in the environment, the current state of the object. The state information may include, without limitation, for each object: current location; current speed and/or acceleration, current heading; current pose; current shape, size, or footprint; type (for example: vehicle, pedestrian, bicycle, static object or obstacle); and/or other state information.

The on-board computing device 1120 may perform one or more prediction and/or forecasting operations. For example, the on-board computing device 1120 may predict future locations, trajectories, and/or actions of one or more objects. For example, the on-board computing device 1120 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the vehicle, the surrounding environment, and/or their relationship(s). For example, if an object is a vehicle and the current driving environment includes an intersection, the on-board computing device 1120 may predict whether the object will likely move straight forward or make a turn. If the perception data indicates that the intersection has no traffic light, the on-board computing device 1120 may also predict whether the vehicle may have to fully stop prior to entering the intersection.

In various embodiments, the on-board computing device 1120 may determine a motion plan for the autonomous vehicle. For example, the on-board computing device 1120 may determine a motion plan for the autonomous vehicle based on the perception data and/or the prediction data. Specifically, given predictions about the future locations of proximate objects and other perception data, the on-board computing device 1120 can determine a motion plan for the vehicle that best navigates the autonomous vehicle relative to the objects at their future locations.

In some embodiments, the on-board computing device 1120 may receive predictions and make a decision regarding how to handle objects and/or actors in the environment of the vehicle. For example, for a particular actor (e.g., a vehicle with a given speed, direction, turning angle, etc.), the on-board computing device 1120 decides whether to overtake, yield, stop, and/or pass based on, for example, traffic conditions, map data, state of the autonomous vehicle, etc. Furthermore, the on-board computing device 1120 also plans a path for the vehicle to travel on a given route, as well as driving parameters (e.g., distance, speed, and/or turning angle). That is, for a given object, the on-board computing device 1120 decides what to do with the object and determines how to do it. For example, for a given object, the on-board computing device 1120 may decide to pass the object and may determine whether to pass on the left side or right side of the object (including motion parameters such as speed). The on-board computing device 1120 may also assess the risk of a collision between a detected object and the vehicle. If the risk exceeds an acceptable threshold, it may determine whether the collision can be avoided if the autonomous vehicle follows a defined vehicle trajectory and/or implements one or more dynamically generated emergency maneuver is performed in a pre-defined time period (e.g., N milliseconds). If the collision can be avoided, then the on-board computing device 1120 may execute one or more control instructions to perform a cautious maneuver (e.g., mildly slow down, accelerate, change lane, or swerve). In contrast, if the collision cannot be avoided, then the on-board computing device 1120 may execute one or more control instructions for execution of an emergency maneuver (e.g., brake and/or change direction of travel).

As discussed above, planning and control data regarding the movement of the autonomous vehicle is generated for execution. The on-board computing device 1120 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Figure 12:
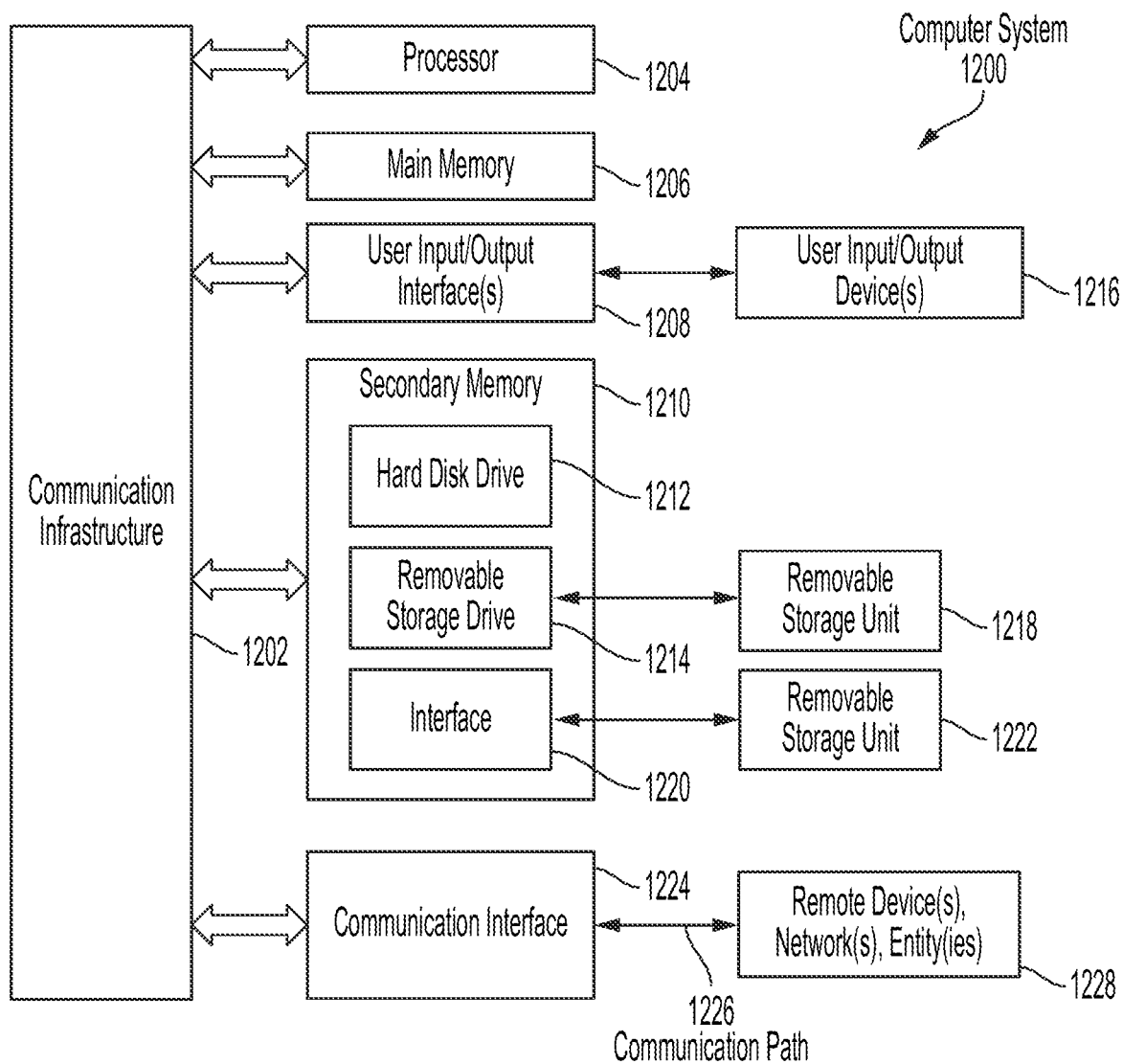
FIG. 12 is an example computer system useful for implementing various embodiments.

The onboard computing device and/or offboard (remote) computing devices may be using one or more computer systems, such as computer system 1200 shown in FIG. 12. Computer system 1200 can be any computer capable of performing the functions described in this document.

Computer system 1200 includes one or more processors (also called central processing units, or CPUs), such as a processor 1204. Processor 1204 is connected to a communication infrastructure or bus 1202. Optionally, one or more of the processors 1204 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1200 also includes user input/output device(s) 1216, such as monitors, keyboards, pointing devices, etc., that communicate with communication infrastructure 1202 through user input/output interface(s) 1208.

Computer system 1200 also includes a main or primary memory 1206, such as random access memory (RAM). Main memory 1206 may include one or more levels of cache. Main memory 61206 has stored therein control logic (i.e., computer software) and/or data.

Computer system 1200 may also include one or more secondary storage devices or memory 1210. In some embodiments of this disclosure, main memory 1206 may be considered the first memory and secondary memory 1210 may be considered the second memory, or vice versa. Alternatively, secondary memory 1206 may include multiple subcomponents that together serve as the first memory and the second memory. Secondary memory 1210 may include, for example, a hard disk drive 1212 and/or a removable storage device or drive 1214. Removable storage drive 1214 may be an external hard drive, a universal serial bus (USB) drive, a memory card such as a compact flash card or secure digital memory, a floppy disk drive, a magnetic tape drive, a compact disc drive, an optical storage device, a tape backup device, and/or any other storage device/drive.

Removable storage drive 1214 may interact with a removable storage unit 1218. Removable storage unit 1218 includes a computer usable or readable storage device having stored thereon computer software (control logic) and/or data. Removable storage unit 1218 may be an external hard drive, a universal serial bus (USB) drive, a memory card such as a compact flash card or secure digital memory, a floppy disk, a magnetic tape, a compact disc, a DVD, an optical storage disk, and/any other computer data storage device. Removable storage drive 1214 reads from and/or writes to removable storage unit 1218 in any suitable known manner.

According to an example embodiment, secondary memory 1210 may include other means, instrumentalities or other approaches for allowing computer programs and/or other instructions and/or data to be accessed by computer system 1200. Such means, instrumentalities or other approaches may include, for example, a removable storage unit 1222 and an interface 1220. Examples of the removable storage unit 1222 and the interface 1220 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1200 may further include a communication or network interface 1224. Communication interface 1224 enables computer system 1200 to communicate and interact with any combination of remote devices, remote networks, remote entities, etc. (individually and collectively referenced by reference number 1228). For example, communication interface 1224 may allow computer system 1200 to communicate with remote devices 1228 over communications path 1226, which may be wired and/or wireless, and which may include any combination of LANs, WANs, the Internet, etc. Control logic and/or data may be transmitted to and from computer system 1200 via communication path 1226.

In some embodiments, a tangible, non-transitory apparatus or article of manufacture comprising a tangible, non-transitory computer useable or readable medium having control logic (software) stored thereon is also referred to in this document as a computer program product or program storage device. This includes, but is not limited to, computer system 1200, main memory 1206, secondary memory 1210, and removable storage units 1218 and 1222, as well as tangible articles of manufacture embodying any combination of the foregoing. Such control logic, when executed by one or more data processing devices (such as computer system 1200), causes such data processing devices to operate as described in this document.

Based on the teachings contained in this disclosure, it will be apparent to persons skilled in the relevant art(s) how to make and use embodiments of this disclosure using data processing devices, computer systems and/or computer architectures other than that shown in FIG. 12. In particular, embodiments can operate with software, hardware, and/or operating system implementations other than those described in this document. The features from different embodiments disclosed herein may be freely combined. For example, one or more features from a method embodiment may be combined with any of the system or product embodiments. Similarly, features from a system or product embodiment may be combined with any of the method embodiments herein disclosed.

As described above, this document discloses system, method, and computer program product embodiments for assisting an autonomous vehicle navigate an environment in which occlusions block the vehicle's ability to detect objects. The system embodiments include a vehicle and a processor. The computer program embodiments include programming instructions (e.g., stored in a memory), to cause a processor to perform the autonomous vehicle navigation methods described in this document. The system embodiments also include a processor which is configured to perform the autonomous vehicle navigation methods described in this document, e.g., via the programming instructions. More generally, the system embodiments include a system comprising means to perform the steps of any of the methods described in this document.

In various embodiments, the navigation methods may include receiving sensor data corresponding to an environment, identifying one or more particles of a plurality of initialized particles that have a non-zero probability of being associated with a potential occluded actor in an occluded region of the environment and generating a trajectory of the autonomous vehicle for traversing the environment based on spatiotemporal reasoning about the occluded region and taking into account the one or more particles. Each particle may be associated with a potential actor.

In various embodiments, the methods may also include generating the plurality of initialized particles by initializing a plurality of particles in a region of interest (e.g., using sampling), and assigning an initial hypothesis state and an initial probability to each of the plurality of particles. Each particle may be representative of an initial hypothesis associated with a potential actor. Optionally, the region of interest may include a conflict region that intersects with a lane of travel of the autonomous vehicle through the environment. Additionally and/or alternatively, the initial hypothesis state of each particle may include, for example, a position, a velocity, an acceleration, and/or an actor type of the potential actor. Optionally, the potential actor can be a pedestrian, a bicyclist, or a vehicle.

In any of the above embodiments, the methods may also include generating a visibility map corresponding to the environment based on the sensor data. The visibility map may include a plurality of cells each having information about an occluded state of that cell and being representative of an ability of the autonomous vehicle to perceive or track one or more objects in the environment. Optionally, the one or more particles may be identified by generating a forecasted hypothesis state for each particle using a process model, assigning an updated probability to each particle based on the visibility map and the forecasted hypothesis state, and identifying particles that have a non-zero updated probability as the one or more particles. A second one or more of the plurality of initialized particles may, optionally, be identified as particles that have a zero updated probability as being associated with potential visible tracked actors. The second one or more of the plurality of initialized particles may be discarded.

In any of the above embodiments, the methods may also include generating a phantom actor corresponding to a worst-case potentially occluded actor in the occluded region based on the one or more particles.

In any of the above embodiments, the methods may also include generating an unknown region frontier that causes the autonomous vehicle to come to a stop before the unknown region frontier based on the one or more particles.

Terms that are relevant to this disclosure include:

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," and the like each refer to a non-transitory device on which computer-readable data, programming instructions or both are stored. The terms "storage," "storage device," and "disk storage" specifically refer to a non-transitory device, such as a hard drive (HDD) or solid-state drive (SSD), that stores data persistently for a relatively longer period. The term "memory" may be used generally in this document to refer either to a storage device that stores information on a persistent basis, or to a device that stores information on a non-persistent basis such as a random access memory (RAM) device. Except where specifically stated otherwise, the terms "memory," "memory device," "storage," "disk storage," "storage device" and the like are intended to include single device embodiments, embodiments in which multiple devices together or collectively store a set of data or instructions, as well as individual sectors within such devices. A "storage location" is a segment, sector, or portion of a storage device. The relative terms "first storage location" and "second storage location" refer to different storage locations, which may be elements of a single device or elements of multiple devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices. The term "wireless communication" refers to communication between two devices in which at least a portion of the communication path includes a signal that is transmitted wirelessly, but it does not necessarily require that the entire communication path be wireless.

As used in this document, the terms "infer" and "inference" (also referred to as "reason" and "reasoning") and generally refer to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

The term "object," when referring to an object that is detected by a vehicle perception system or simulated by a simulation system, is intended to encompass both stationary objects and moving (or potentially moving) actors, except where specifically stated otherwise by use of the term "actor" or "stationary object."

When used in the context of autonomous vehicle motion planning, the term "trajectory" refers to the plan that the vehicle's motion planning system will generate, and which the vehicle's motion control system will follow when controlling the vehicle's motion. A trajectory includes the vehicle's planned position and orientation at multiple points in time over a time horizon, as well as the vehicle's planned steering wheel angle and angle rate over the same time horizon. An autonomous vehicle's motion control system will consume the trajectory and send commands to the vehicle's steering controller, brake controller, throttle controller and/or other motion control subsystem to move the vehicle along a planned path.

A "trajectory" of an actor that a vehicle's perception or prediction systems may generate refers to the predicted path that the actor will follow over a time horizon, along with the predicted speed of the actor and/or position of the actor along the path at various points along the time horizon.

In this document, the terms "street," "lane," "road" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" or "road" may represent an airway and a lane may be a portion of the airway. If the autonomous vehicle is a watercraft, then the term "street" or "road" may represent a waterway and a lane may be a portion of the waterway.

In this document, when terms such as "first" and "second" are used to modify a noun, such use is simply intended to distinguish one item from another, and is not intended to require a sequential order unless specifically stated.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes example embodiments for example fields and applications, it should be understood that the disclosure is not limited to the disclosed examples. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described in this document. Further, embodiments (whether or not explicitly described) have significant utility to fields and applications beyond the examples described in this document.

Embodiments have been described in this document with the aid of functional building blocks illustrating the implementation of specified functions and relationships. The boundaries of these functional building blocks have been arbitrarily defined in this document for the convenience of the description. Alternate boundaries can be defined as long as the specified functions and relationships (or their equivalents) are appropriately performed. Also, alternative embodiments can perform functional blocks, steps, operations, methods, etc. using orderings different than those described in in this document.

The features from different embodiments disclosed herein may be freely combined. For example, one or more features from a method embodiment may be combined with any of the system or product embodiments. Similarly, features from a system or product embodiment may be combined with any of the method embodiments herein disclosed.

References in this document to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described in this document. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments, but should be defined only in accordance with the following claims and their equivalents.

As described above, this document discloses system, method, and computer program product embodiments for operating a vehicle. The system embodiments include a processor or computing device implementing the methods for operating a vehicle. The computer program embodiments include programming instructions, for example, stored in a memory, to cause a processor to perform the data management methods described in this document. The system embodiments also include a processor which is configured to perform the methods described in this document, for example, via the programming instructions. More generally, the system embodiments include a system comprising means to perform the steps of any of the methods described in this document.

Without excluding further possible embodiments, certain example embodiments are summarized in the following clauses.

Clause 1. A method of navigating an autonomous vehicle through an environment comprising an occluded region, the method comprising, by a processor:
receiving sensor data corresponding to the environment;
identifying one or more particles of a plurality of initialized particles that have a non-zero probability of being associated with a potential occluded actor in the occluded region, each particle being associated with a potential actor; and
generating, based on spatiotemporal reasoning about the occluded region and taking into account the one or more particles, a trajectory of the autonomous vehicle for traversing the environment.

Clause 2. The method of clause 1, further comprising generating the plurality of initialized particles by:
initializing, using sampling, a plurality of particles in a region of interest, each particle being representative of an initial hypothesis associated with a potential actor; and
assigning, to each of the plurality of particles, an initial hypothesis state and an initial probability.

Clause 3. The method of clause 2, wherein the region of interest comprises a conflict region that intersects with a lane of travel of the autonomous vehicle through the environment.

Clause 4. The method of any of the above clauses, wherein the initial hypothesis state of each particle comprises at least one of the following: a position, a velocity, an acceleration, or an actor type of the potential actor.

Clause 5. The method of any of the above clauses, wherein the potential actor is selected from at least one of the following: a pedestrian, a bicyclist, or a vehicle.

Clause 6. The method of any of the above clauses, further comprising generating, based on the sensor data, a visibility map corresponding to the environment, the visibility map comprising a plurality of cells that each include information about an occluded state of that cell and being representative of an ability of the autonomous vehicle to perceive or track one or more objects in the environment.

Clause 7. The method of clause 6, wherein identifying the one or more particles comprises:
generating, using a process model, for each of the plurality of initialized particles, a forecasted hypothesis state;
assigning, based on the visibility map and the forecasted hypothesis state, an updated probability to each of the plurality of particles; and
identifying particles that have a non-zero updated probability as the one or more particles.

Clause 8. The method of clause 7, further comprising:
identifying a second one or more of the plurality of initialized particles as particles that have a zero updated probability as being associated with potential visible tracked actors; and
discarding the second one or more of the plurality of initialized particles.

Clause 9. The method of any of the above clauses, further comprising generating, based on the one or more particles, a phantom actor corresponding to a worst-case potentially occluded actor in the occluded region.

Clause 10. The method of any of the above clauses, further comprising generating, based on the one or more particles, an unknown region frontier that causes the autonomous vehicle to come to a stop before the unknown region frontier.

Clause 11. A system comprising means for performing steps of any of the above method clauses.

Clause 12. A computer program, or a storage medium storing the computer program, comprising instructions, which when executed by one or more suitable processors cause any of the processors to perform the steps of any of the above method clauses.

Clause 13. A system for an autonomous vehicle, the system comprising:
at least one processor;
programming instructions stored in a memory and configured to cause the processor to:
receive sensor data corresponding to an environment;
identify one or more particles of a plurality of initialized particles that have a non-zero probability of being associated with a potential occluded actor in an occluded region of the environment, each particle being associated with a potential actor; and
generate, based on spatiotemporal reasoning about the occluded region and taking into account the one or more particles, a trajectory of the autonomous vehicle for traversing the environment.

Clause 14. The system of clause 13, further comprising additional programming instructions that are configured to cause the processor to generate the plurality of initialized particles by:
initializing, using sampling, a plurality of particles in a region of interest, each particle being representative of an initial hypothesis associated with a potential actor; and
assigning, to each of the plurality of particles, an initial hypothesis state and an initial probability.

Clause 15. The system of clause 14, wherein the region of interest comprises a conflict region that intersects with a lane of travel of the autonomous vehicle through the environment.

Clause 16. The system of any of the above system clauses, wherein the initial hypothesis state of each particle comprises at least one of the following: a position, a velocity, an acceleration, or an actor type of the potential actor.

Clause 17. The system of any of the above system clauses, wherein the potential actor is selected from at least one of the following: a pedestrian, a bicyclist, or a vehicle.

Clause 18. The system of any of the above system clauses, further comprising additional programming instructions that are configured to cause the processor to generate, based on the sensor data, a visibility map corresponding to the environment, the visibility map comprising a plurality of cells that each include information about an occluded state of that cell and being representative of an ability of the autonomous vehicle to perceive or track one or more objects in the environment.

Clause 19. The system of clause 18, wherein the instructions to identify the one or more particles comprise instructions to:
generate, using a process model, for each of the plurality of initialized particles, a forecasted hypothesis state;
assign, based on the visibility map and the forecasted hypothesis state, an updated probability to each of the plurality of particles; and
identify particles that have a non-zero updated probability as the one or more particles.

Clause 20. The system of any of the above system clauses, further comprising additional programming instructions that are configured to cause the processor to:
identify a second one or more of the plurality of initialized particles as particles that have a zero updated probability as being associated with potential visible tracked actors; and
discard the second one or more of the plurality of initialized particles.

Clause 21. The system of any of the above system clauses, further comprising additional programming instructions that are configured to cause the processor to generate, based on the one or more particles, a phantom actor corresponding to a worst-case potentially occluded actor in the occluded region.

Clause 22. A computer program product comprising a non-transitory computer-readable medium that stores instructions that, when executed by a computing device, will cause the computing device to perform operations comprising:
receiving sensor data corresponding to an environment;
identifying one or more particles of a plurality of initialized particles that have a non-zero probability of being associated with a potential occluded actor in the occluded region, each particle being associated with a potential actor; and
generating, based on spatiotemporal reasoning about the occluded region and taking into account the one or more particles, a trajectory of the autonomous vehicle for traversing the environment.

The invention claimed is:

1. A method of navigating an autonomous vehicle through an environment comprising an occluded region, the method comprising: generating a plurality of initialized particles by: initializing, using sampling, a plurality of particles in a region of interest using map data and absent sensor data, each particle being representative of an initial hypothesis associated with a potential actor; and assigning, to each of the plurality of particles, an initial hypothesis state and an initial probability using a uniform distribution sampling and absent the sensor data; receiving the sensor data corresponding to the environment; generating, using the sensor data, a visibility map corresponding to the environment, the visibility map comprising a plurality of cells that each include information about an occluded state of that cell and being representative of an ability of the autonomous vehicle to perceive or track one or more objects in the environment; generating, for each of the plurality of initialized particles, a forecasted hypothesis state by propagating the respective initialized particle using a process model associated with the particle to a measurement time associated with the sensor data; assigning, using the visibility map and the forecasted hypothesis state, an updated probability to each of the plurality of initialized particles; identifying, based on the updated probabilities, one or more particles among the plurality of initialized particles having a non-zero probability as being associated with a potential occluded actor in the occluded region, each particle being associated with a potential actor; and generating, based on spatiotemporal reasoning about the occluded region and taking into account the one or more particles, a trajectory of the autonomous vehicle for traversing the environment; and controlling the autonomous vehicle to traverse the environment using the trajectory generated.

2. The method of claim 1, wherein the region of interest comprises a conflict region that intersects with a lane of travel of the autonomous vehicle through the environment.

3. The method of claim 2, wherein the initial hypothesis state of each particle comprises at least one of the following: a position, a velocity, an acceleration, or an actor type of the potential actor.

4. The method of claim 2, wherein the potential actor is selected from at least one of the following: a pedestrian, a bicyclist, or a vehicle.

5. The method of claim 1, further comprising:
identifying a second one or more of the plurality of initialized particles as particles that have a zero updated probability as being associated with potential visible tracked actors; and
discarding the second one or more of the plurality of initialized particles.

6. The method of claim 1, further comprising generating, based on the one or more particles, a phantom actor corresponding to a worst-case potentially occluded actor in the occluded region.

7. The method of claim 1, further comprising generating, based on the one or more particles, an unknown region frontier that causes the autonomous vehicle to come to a stop before the unknown region frontier.

8. A system for navigating an autonomous vehicle, the system comprising: at least one processor; and programming instructions stored in a memory and configured to cause the processor to: generate a plurality of initialized particles by: initializing, using sampling, a plurality of particles in a region of interest using map data and absent sensor data, each particle being representative of an initial hypothesis associated with a potential actor; and assigning, to each of the plurality of particles, an initial hypothesis state and an initial probability using a uniform distribution sampling and absent the sensor data; receive the sensor data corresponding to an environment; generate, based on the sensor data, a visibility map corresponding to the environment, the visibility map comprising a plurality of cells that each include information about an occluded state of that cell and being representative of an ability of the autonomous vehicle to perceive or track one or more objects in the environment; generate, for each of the plurality of initialized particles, a forecasted hypothesis state by propagating the respective initialized particle using a process model associated with the particle to a measurement time associated with the sensor data; assign, using the visibility map and the forecasted hypothesis state, an updated probability to each of the plurality of initialized particles; identify, based on the updated probabilities, one or more particles among the plurality of initialized particles having a non-zero probability as being associated with a potential occluded actor in an occluded region of the environment, each particle being associated with a potential actor; generate, based on spatiotemporal reasoning about the occluded region and taking into account the one or more particles, a trajectory of the autonomous vehicle for traversing the environment; and control the autonomous vehicle to traverse the environment using the trajectory generated.

9. The system of claim 8, wherein the region of interest comprises a conflict region that intersects with a lane of travel of the autonomous vehicle through the environment.

10. The system of claim 8, wherein the initial hypothesis state of each particle comprises at least one of the following: a position, a velocity, an acceleration, or an actor type of the potential actor.

11. The system of claim 8, wherein the potential actor is selected from at least one of the following: a pedestrian, a bicyclist, or a vehicle.

12. The system of claim 8, further comprising additional programming instructions that are configured to cause the processor to:
   identify a second one or more of the plurality of initialized particles as particles that have a zero updated probability as being associated with potential visible tracked actors; and
   discard the second one or more of the plurality of initialized particles.

13. The system of claim 8, further comprising additional programming instructions that are configured to cause the processor to generate, based on the one or more particles, a phantom actor corresponding to a worst-case potentially occluded actor in the occluded region.

14. A computer program product comprising a non-transitory computer-readable medium that stores instructions that, when executed by a computing device, will cause the computing device to perform operations comprising: generating a plurality of initialized particles by: initializing, using sampling, a plurality of particles in a region of interest using map data and absent sensor data, each particle being representative of an initial hypothesis associated with a potential actor; and assigning, to each of the plurality of particles, an initial hypothesis state and an initial probability using a uniform distribution sampling and absent the sensor data; receiving the sensor data corresponding to an environment of an autonomous vehicle; generating, using the sensor data, a visibility map corresponding to the environment, the visibility map comprising a plurality of cells that each include information about an occluded state of that cell and being representative of an ability of the autonomous vehicle to perceive or track one or more objects in the environment;
   generating, for each of the plurality of initialized particles, a forecasted hypothesis state by propagating the respective initialized particle using a process model associated with the particle to a measurement time associated with the sensor data; assigning, using the visibility map and the forecasted hypothesis state, an updated probability to each of the plurality of initialized particles; identifying, based on the updated probabilities, one or more particles from among the plurality of initialized particles having a non-zero probability as being associated with a potential occluded actor in an occluded region of the environment, each particle being associated with a potential actor; generating, based on spatiotemporal reasoning about the occluded region and taking into account the one or more particles, a trajectory of the autonomous vehicle for traversing the environment; and controlling the autonomous vehicle to traverse the environment using the trajectory generated.

* * * * *